Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954

29 Sheets-Sheet 1

INVENTOR.
Abraham Novick

BY Moses, Nolte, Crews & Berry
ATTORNEYS

INVENTOR.
Abraham Novick

BY Moses, Nolte, Crews & Berry
ATTORNEYS

INVENTOR
Abraham Novick

BY Moses, Nolte, Crews + Berry
ATTORNEY

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 4

INVENTOR.
Abraham Novick

BY Moses, Nolte, Crews + Berry
ATTORNEYS

INVENTOR.
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 6

INVENTOR.
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 7

INVENTOR.
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING
DIAMOND SHAPED ENVELOPE BLANKS

Filed Nov. 17, 1954 29 Sheets-Sheet 8

INVENTOR.
Abraham Novick

BY Moses, Nolte, Crews & Berry
ATTORNEYS

INVENTOR
Abraham Novick
BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 10

INVENTOR.
Abraham Novick

BY Moses, Nolte, Crews & Berry
ATTORNEYS

INVENTOR.
Abraham Novick

BY Moses, Nolte, Crews & Berry
ATTORNEYS

Sept. 6, 1960
A. NOVICK
2,951,408
MECHANISM FOR CUTTING, NOTCHING AND FEEDING
DIAMOND SHAPED ENVELOPE BLANKS
Filed Nov. 17, 1954
29 Sheets-Sheet 12

INVENTOR.
Abraham Novick
BY Moses, Nolte, Crews & Berry
ATTORNEYS.

INVENTOR.
Abraham Novick

BY Moses, Nolte Crews + Berry
ATTORNEYS

INVENTOR.
Abraham Novick
BY Moses, Nolte, Crews & Berry
ATTORNEYS

INVENTOR.
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954

29 Sheets-Sheet 16

INVENTOR.
Abraham Novick

BY Moran, Nolte, Crews & Berry
ATTORNEYS

INVENTOR.
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 18

INVENTOR.
Abraham Novick

BY Moses, Nolte, Crews & Berry
ATTORNEYS

INVENTOR.
Abraham Novick
BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 20

INVENTOR.
Abraham Novick

BY Moses, Nolte, Crews & Berry
ATTORNEYS

INVENTOR.
Abraham Novick

BY Moses, Nolte, Crews & Berry
ATTORNEYS

INVENTOR.
Abraham Novick
BY Moses, Nolte, Crews & Berry
ATTORNEYS

INVENTOR.
Abraham Novick

BY Moses, Nolte, Crews & Berry
ATTORNEYS

INVENTOR.
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954

29 Sheets-Sheet 25

INVENTOR
Abraham Novick

BY Moses, Nolte, Crews & Berry
ATTORNEYS

Sept. 6, 1960 A. NOVICK 2,951,408

MECHANISM FOR CUTTING, NOTCHING AND FEEDING DIAMOND SHAPED ENVELOPE BLANKS

Filed Nov. 17, 1954 29 Sheets-Sheet 26

INVENTOR.
Abraham Novick

BY Mosca, Notte, Crews & Berry
ATTORNEYS

INVENTOR.
Abraham Novick

BY Mosco, Nolte, Crewe & Berry
ATTORNEYS

Sept. 6, 1960

A. NOVICK 2,951,408

MECHANISM FOR CUTTING, NOTCHING AND FEEDING DIAMOND SHAPED ENVELOPE BLANKS

Filed Nov. 17, 1954

29 Sheets-Sheet 28

INVENTOR.
Abraham Novick

BY Moses, Nolte, Crews & Berry
ATTORNEYS

INVENTOR
Abraham Novick
BY Moses, Nolte, Crews & Berry
ATTORNEY 2,951,408

MECHANISM FOR CUTTING, NOTCHING AND FEEDING DIAMOND SHAPED ENVELOPE BLANKS

Abraham Novick, Flushing, N.Y., assignor to F. L. Smithe Machine Co., Inc., New York, N.Y., a corporation of New York Filed Nov. 17, 1954, Ser. No. 469,393

30 Claims. (Cl. 83—88)

This invention relates to mechanisms for use in cutting diamond shaped blanks from paper webs and converting them directly and successively into finished envelopes as they are cut. The present improved mechanism is desirably provided as an attachment for wide range rotary envelope making machines, and may be used alternatively with the usual stack feeder as a source of blank supply for the machine.

Web fed envelope machines are not broadly new, but all prior web fed machines which have appeared upon the market have been extremely limited in variety of output, being restricted in each instance to the making of an envelope of a single specified size and shape.

It is a primary object of the present invention to provide a web fed envelope making machine which is capable of operating dependably and at high speed to manufacture envelopes of a wide range of sizes and shapes from web material.

To this end the machine is desirably made to include many advantageous features, which features enter into novel and useful combinations and subcombinations with one another, some of them also being novel per se.

Among the salient features the following are included:

(1) In conjunction with the feeding of web material of selected width along a prescribed path, provision is made of a flying cutter unit comprising substantially straight rotary and stationary cooperative blades which blades are angularly adjustable in unison to various positions to cause the line of cut to stand at any desired angle to the web feeding path throughout a wide range, and of change speed gearing for controlling the length of web fed in a cycle. By coordinately adjusting the angle of cut, the rate of web feeding and the width of the web, rhombic blanks of various selected sizes and shapes can be produced.

(2) There is combined with the web feeding and cutting mechanism an adjustable blank feeder for picking up the blank the instant it is cut and advancing it in the direction of web feeding through a prescribed distance which is varied according to the requirements of the particular blank, being dictated by the size and shape of the blank.

(3) There is combined with the aforesaid mechanism a conical blank turning mechanism adjustable to seize a blank just as it arrives at the initial turning position, as determined by its size and shape, and to turn the blank through a required angle, determined by the shape of the blank, for yielding up the blank precisely as the turning is completed, with the longitudinal diagonal of the blank located in the center line of feed of a prescribed blank feeding path.

(4) There is combined with the conical turner an adjustable feeding mechanism which seizes the blank just as the turning is completed and advances it clear of the cones and into subsequent feeding instrumentalities operating constantly at the same surface speed as said mechanism, whereby the blank, regardless of its length, is assuredly carried forward toward notching mechanism.

(5) There is combined with the last mentioned feeding means a variable speed feeder which (*a*) runs first at constant speed and engages the blank to feed it while the blank is still being advanced by the preceding constant speed feeding mechanism, (*b*) assumes full control of the blank and brings it to rest momentarily for notching, (*c*) accelerates the blank to normal constant speed and turns over control of the blank to following constant speed feeding mechanism, then, while in a non-feeding condition, runs at higher than normal speed briefly, and finally resumes normal speed in preparation for a new cycle.

(6) There is combined with the variable speed feeding mechanism referred to, four notching cutters together with means for operating the notching cutters in time with the blank feeding to cause them to act simultaneously upon the blank at the instant when the blank is arrested. It is a feature that the front notching cutters make one revolution per cycle of the machine but that the rear notching cutters make two revolutions per cycle, one idle and one active, in order to avoid interference with the next oncoming blank.

(7) There is provided in conjunction with the notching cutters, carriers therefor and adjustable mechanism for adjusting the right and left pairs of carriers simultaneously and equally toward and from the longitudinal center line of blank feeding, together with adjusting mechanism for adjusting the front and rear pairs of carriers simultaneously and equally toward and from a fixed transverse line. It is an important feature that provision is made of mechanism for maintaining driving connection to said cutters through engaged pairs of long spiral gears, which gears are fast on adjustable shafts disposed at right angles to one another.

(8) It is an important point that the turning cones, though of as large diameters at their larger ends as the largest feed rollers employed in the machine are driven through two revolutions during each cycle, the purpose being to safeguard against the possibility of a comparatively slow moving blank portion located relatively near to the center of turning hanging back to such an extent that it is temporarily overtaken and overlapped by a portion of a following blank. Thus, in each cycle the cones execute two revolutions, the first of which includes an active period of blank turning but the second of which is invariably an ineffective or idle revolution.

The several features referred to all combine to make available a practical and efficient web fed machine which is capable throughout of operating upon blanks of a wide variety of shapes and sizes. The attachment is capable of operating as rapidly as a standard, wide range, rotary envelope making machine, and does not reduce the rate of output of such a machine.

Other objects and advantages will hereinafter appear.

In the drawing forming part of this specification;

Figure 1:
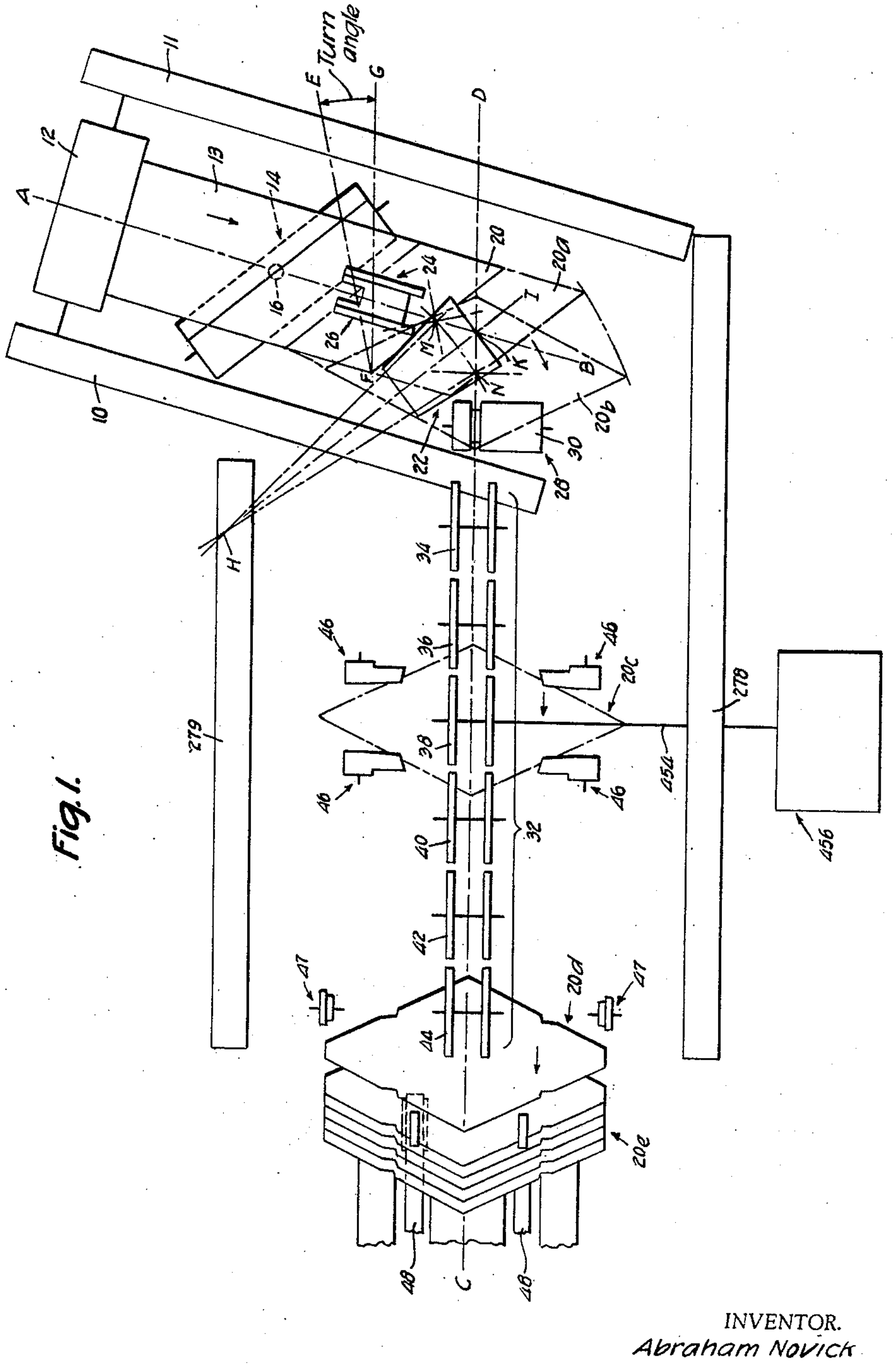
Figure 1 is a diagrammatic plan view of a portion of an envelope making machine embodying features of the present invention and showing a web and several blanks in process of treatment.
Figure 3A:
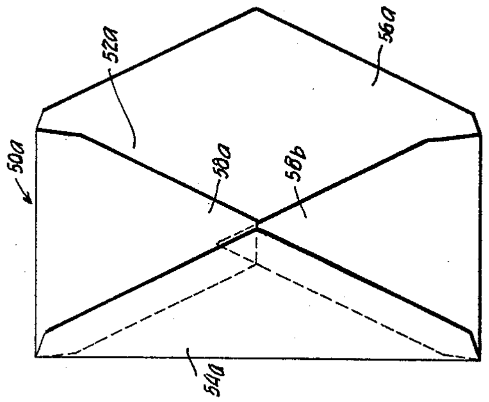
Figure 3:
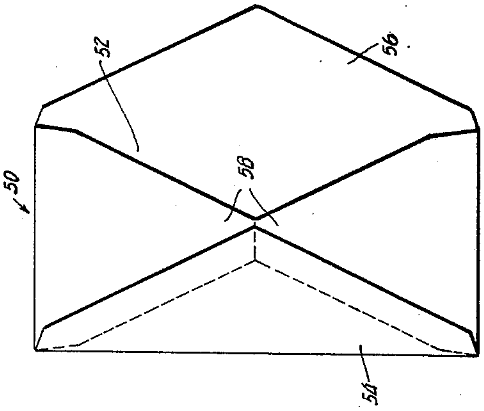
Figure 4:
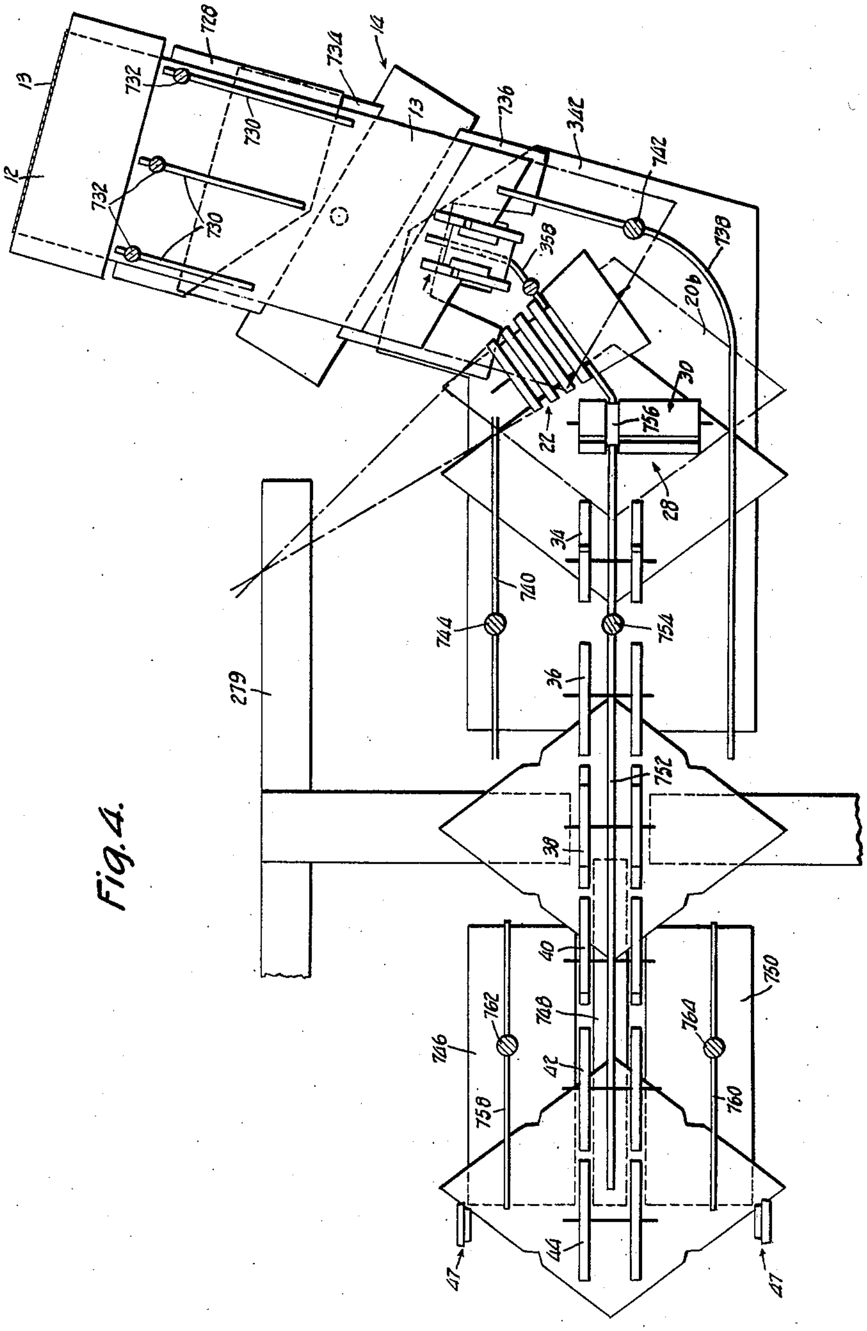
Figure 6:
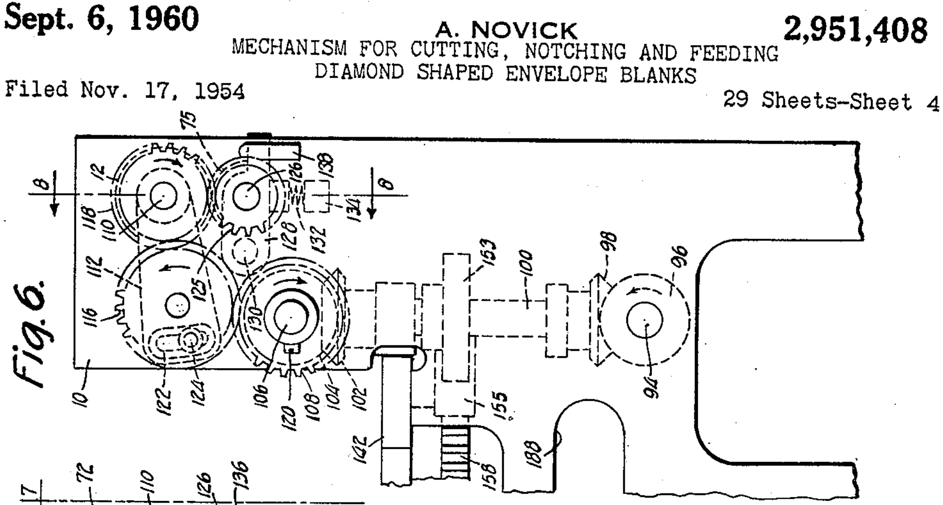
Figure 5:
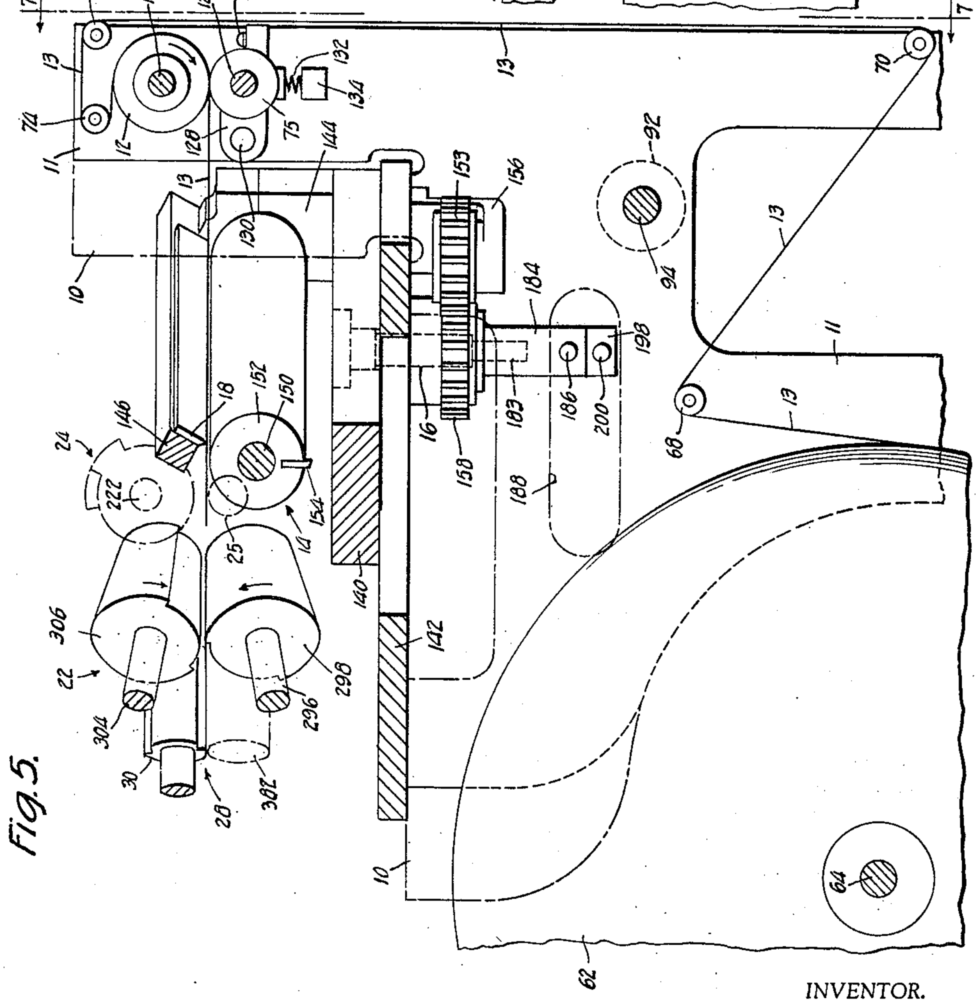
Figure 7:
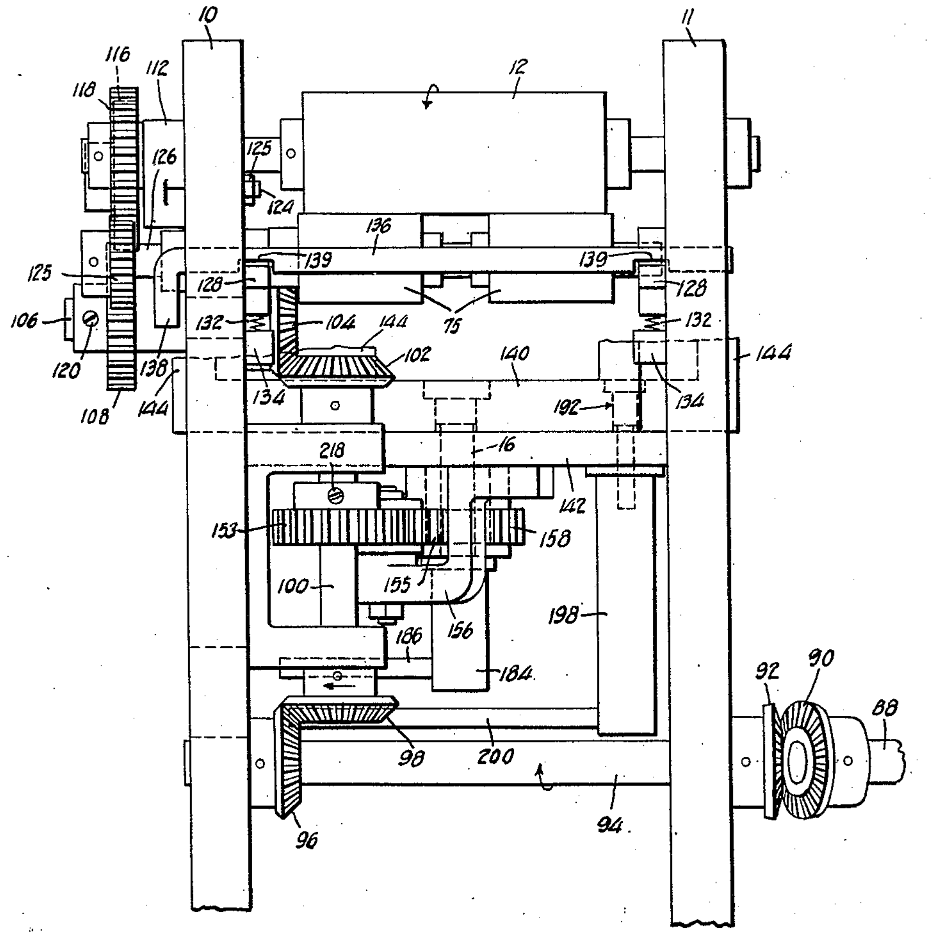
Figure 8:
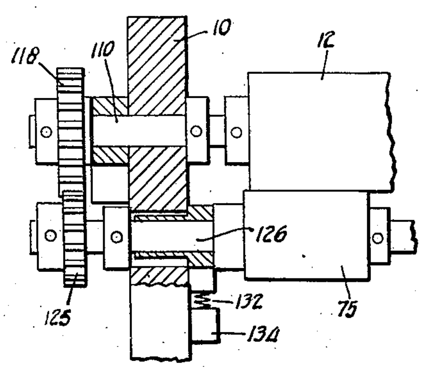
Figure 9:
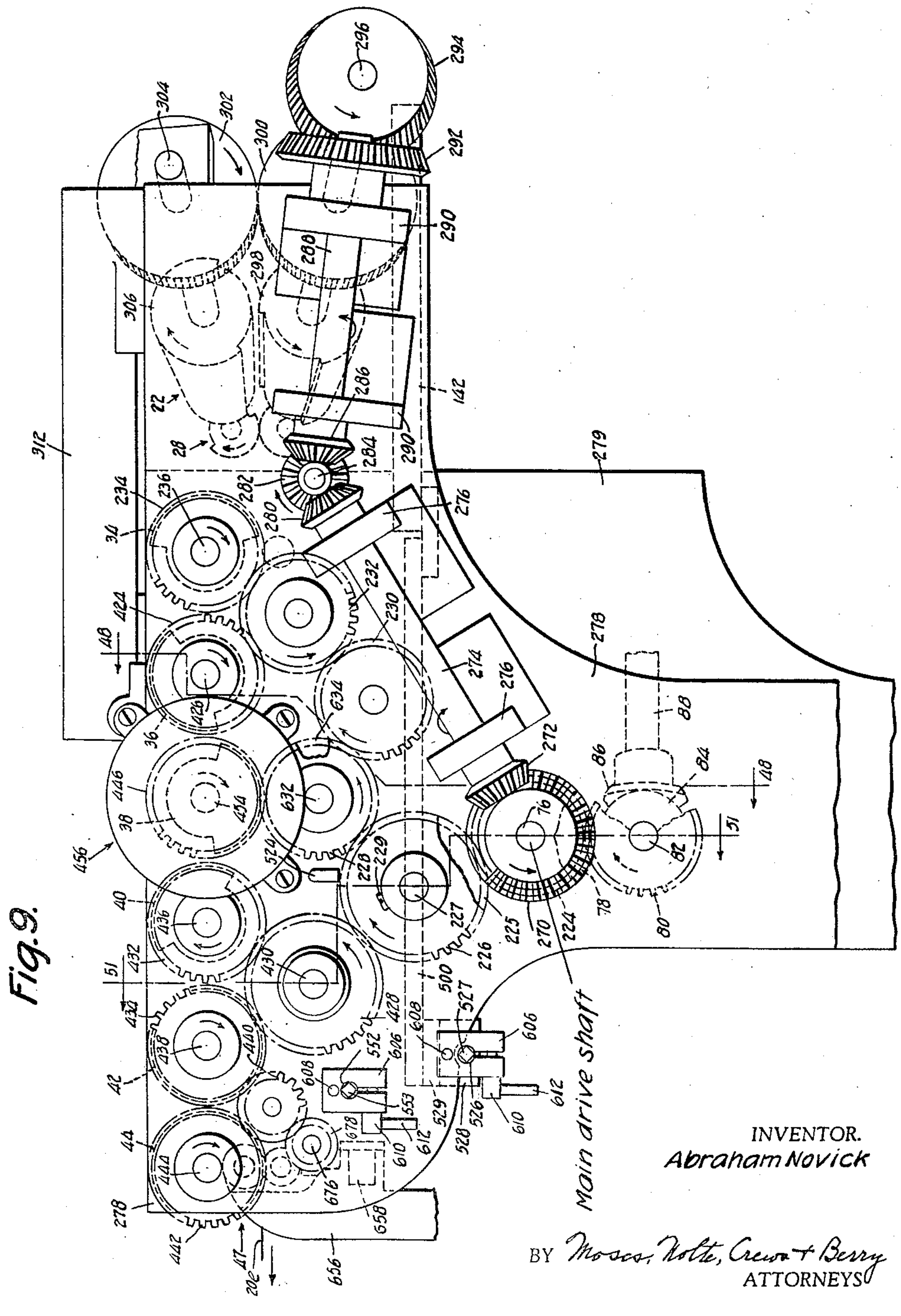
Figures 10, 10A:
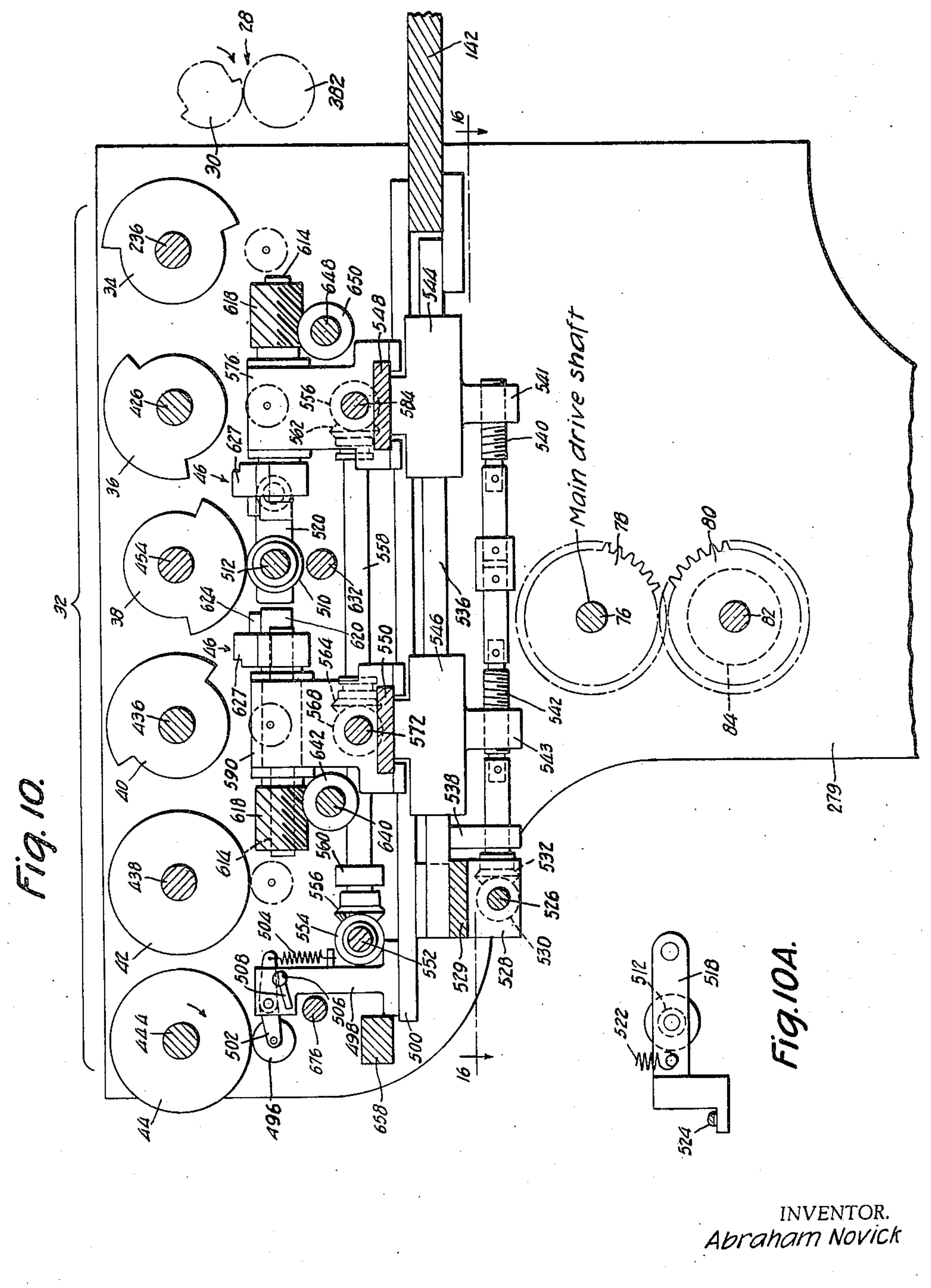
Figure 11:
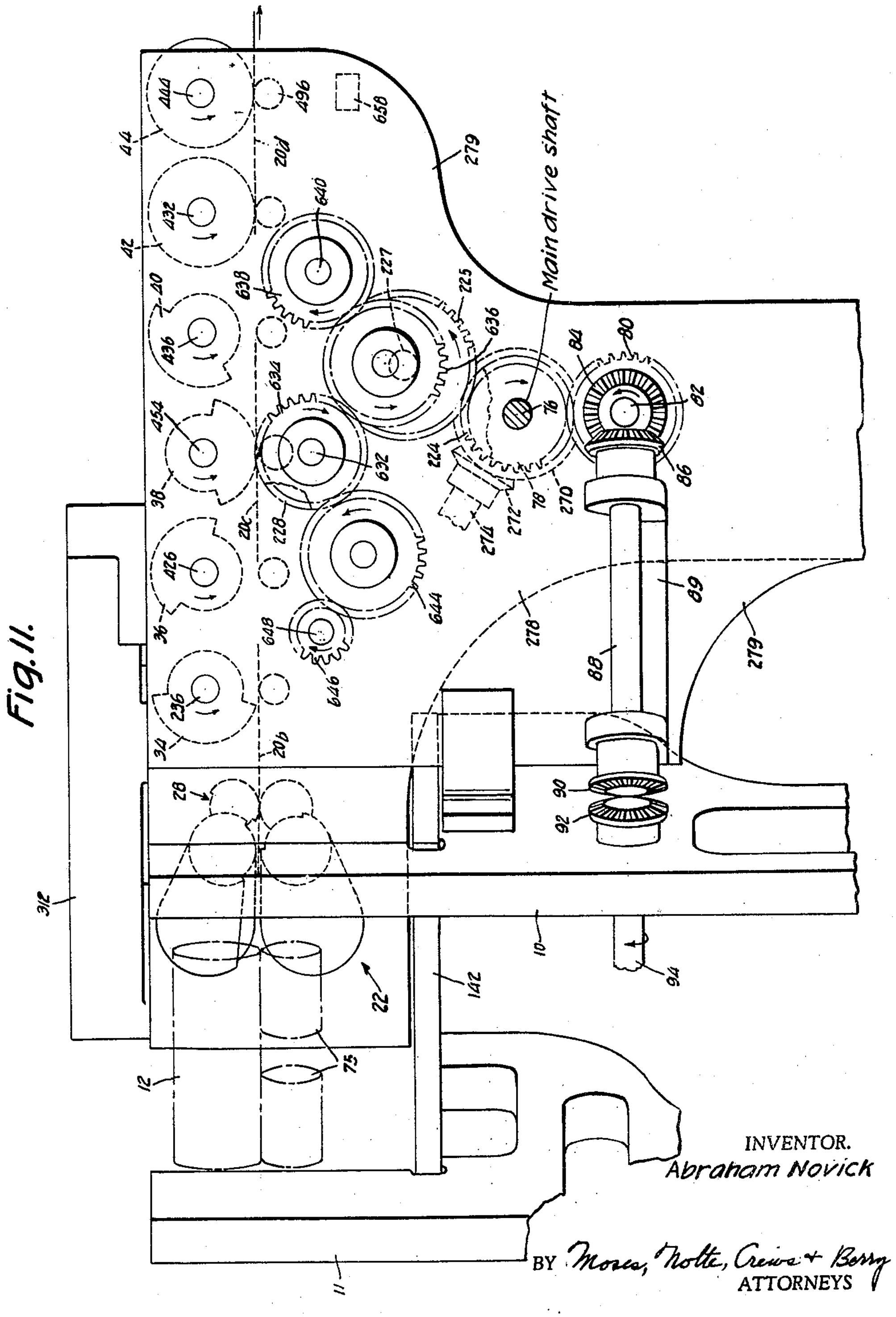
Figure 12:
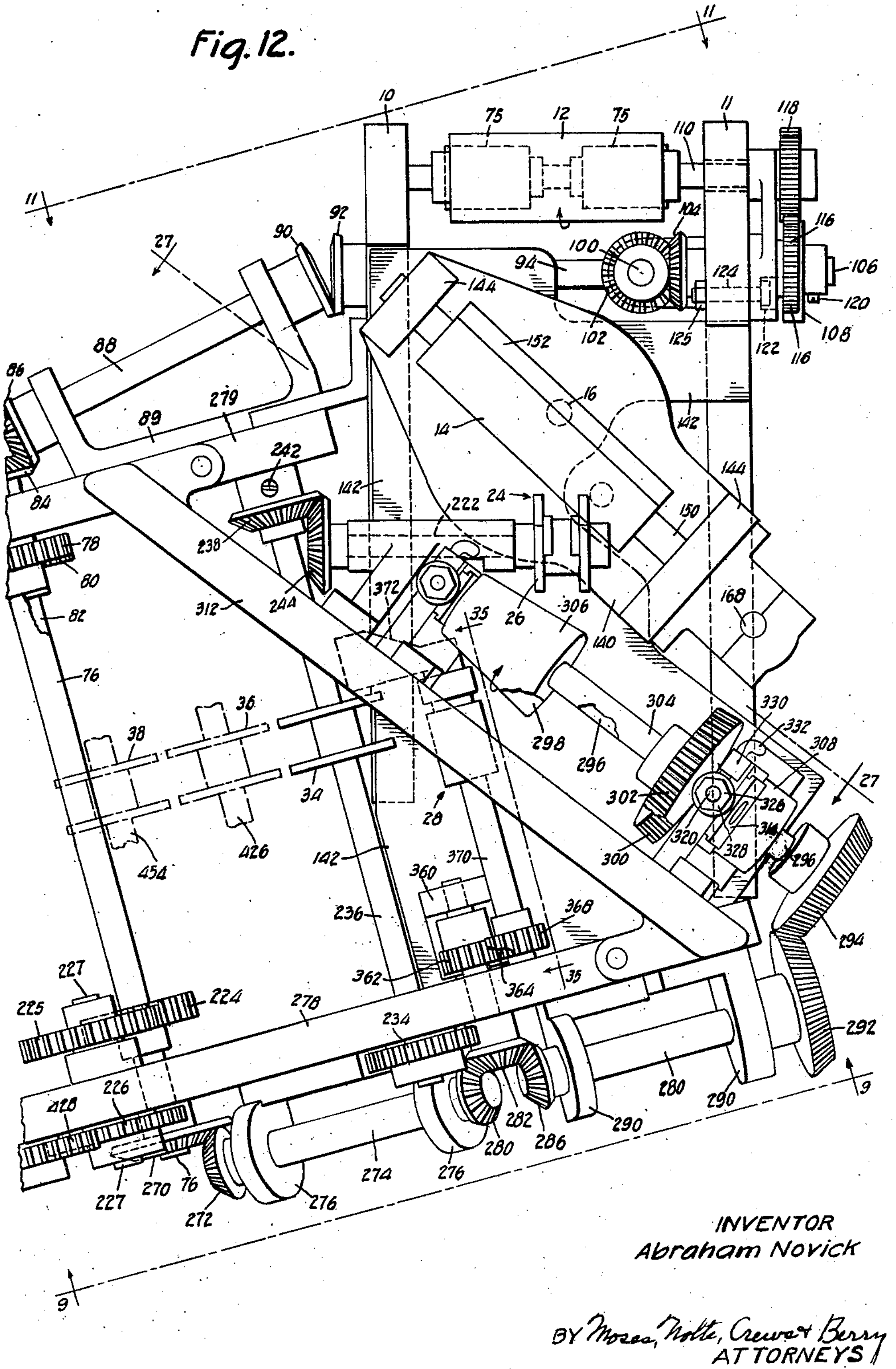
Figure 13:
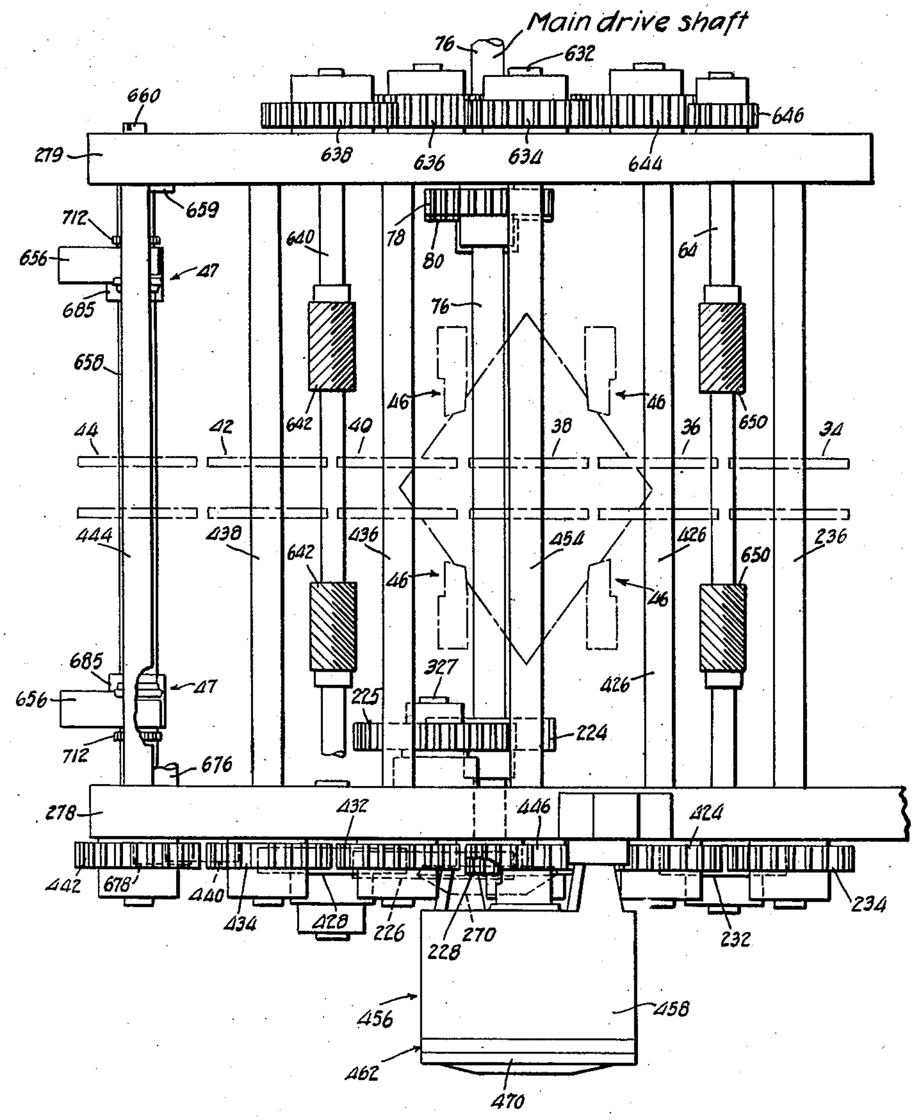
Figure 14:
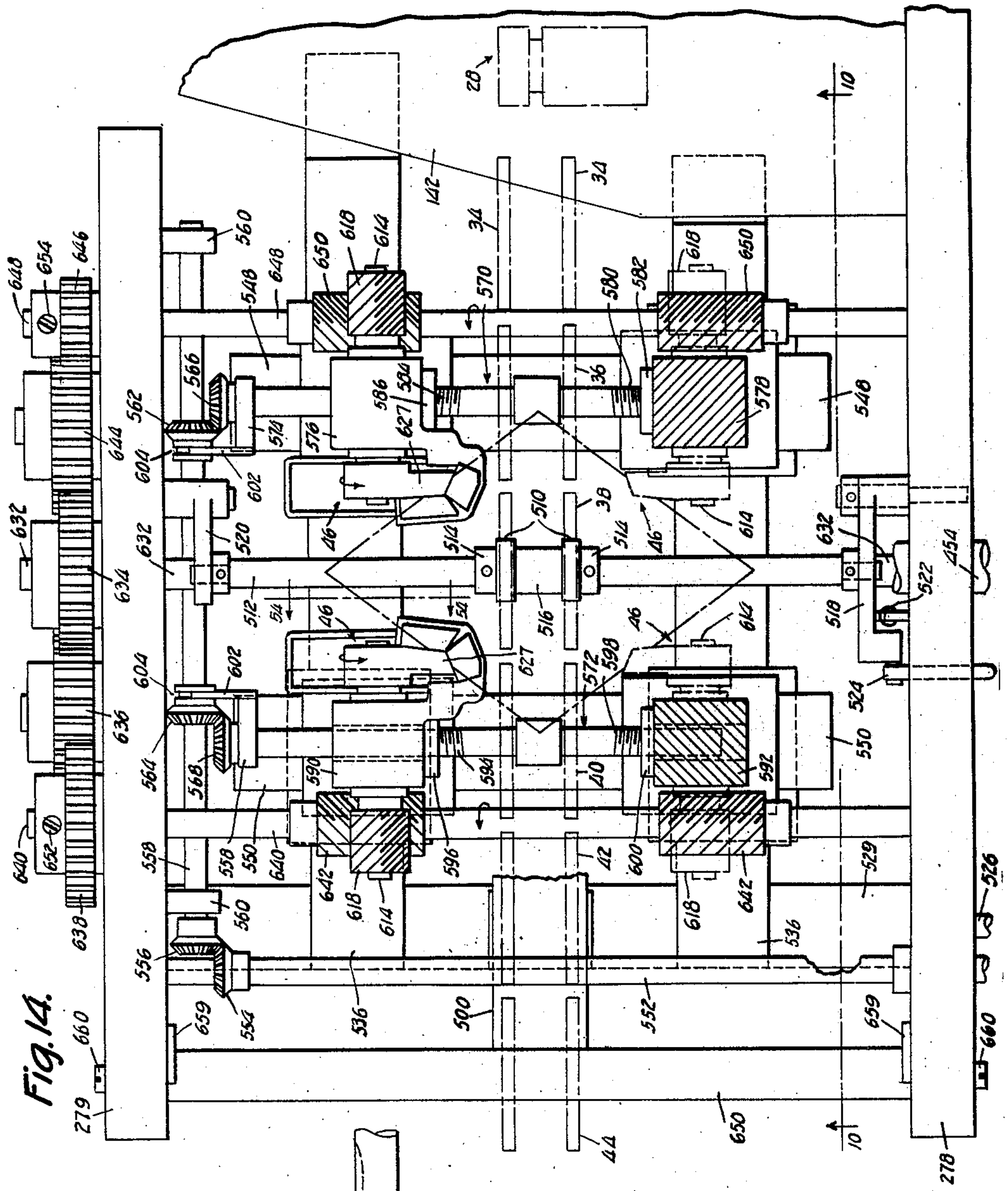
Figure 15:
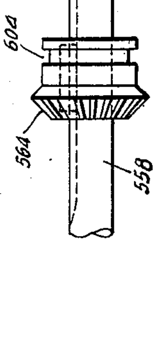
Figure 16:
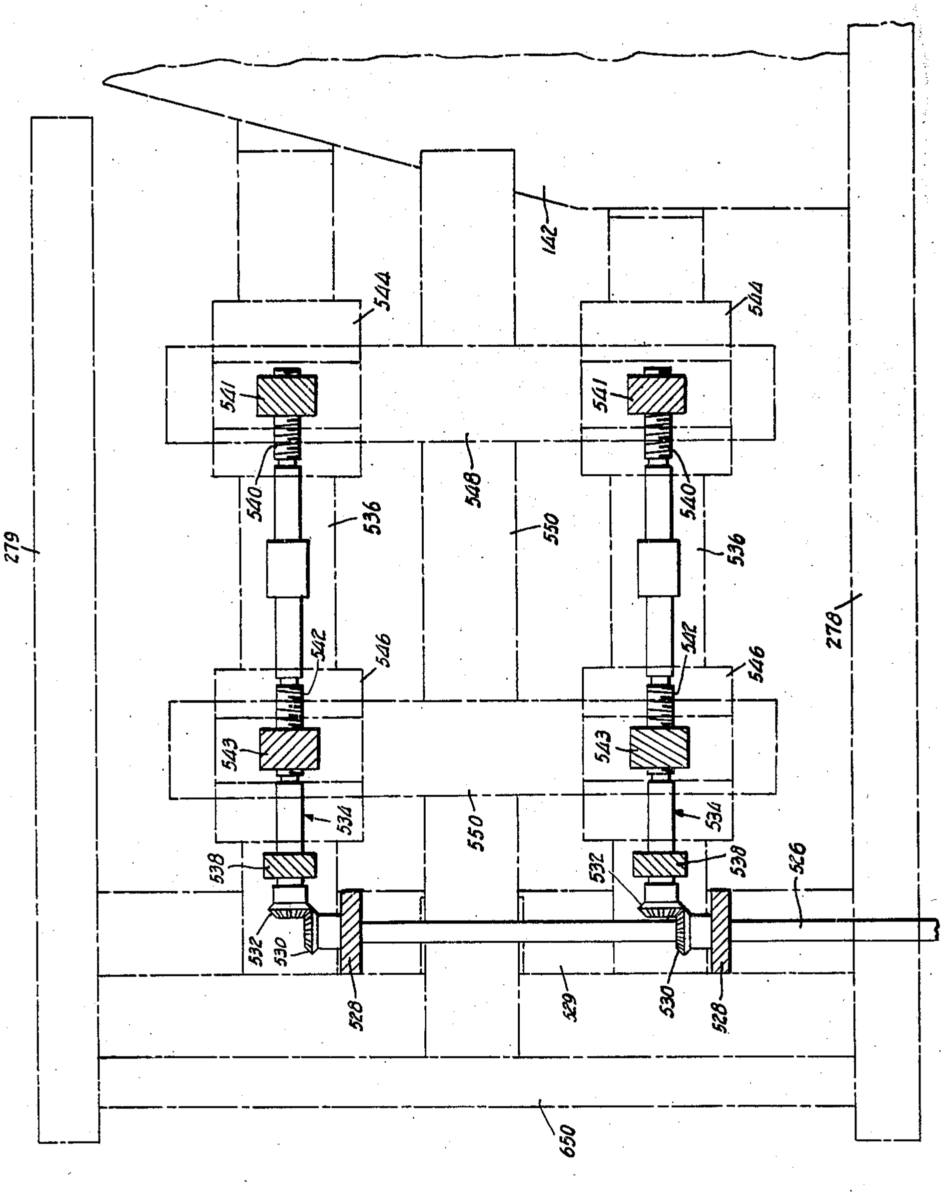
Figure 17:
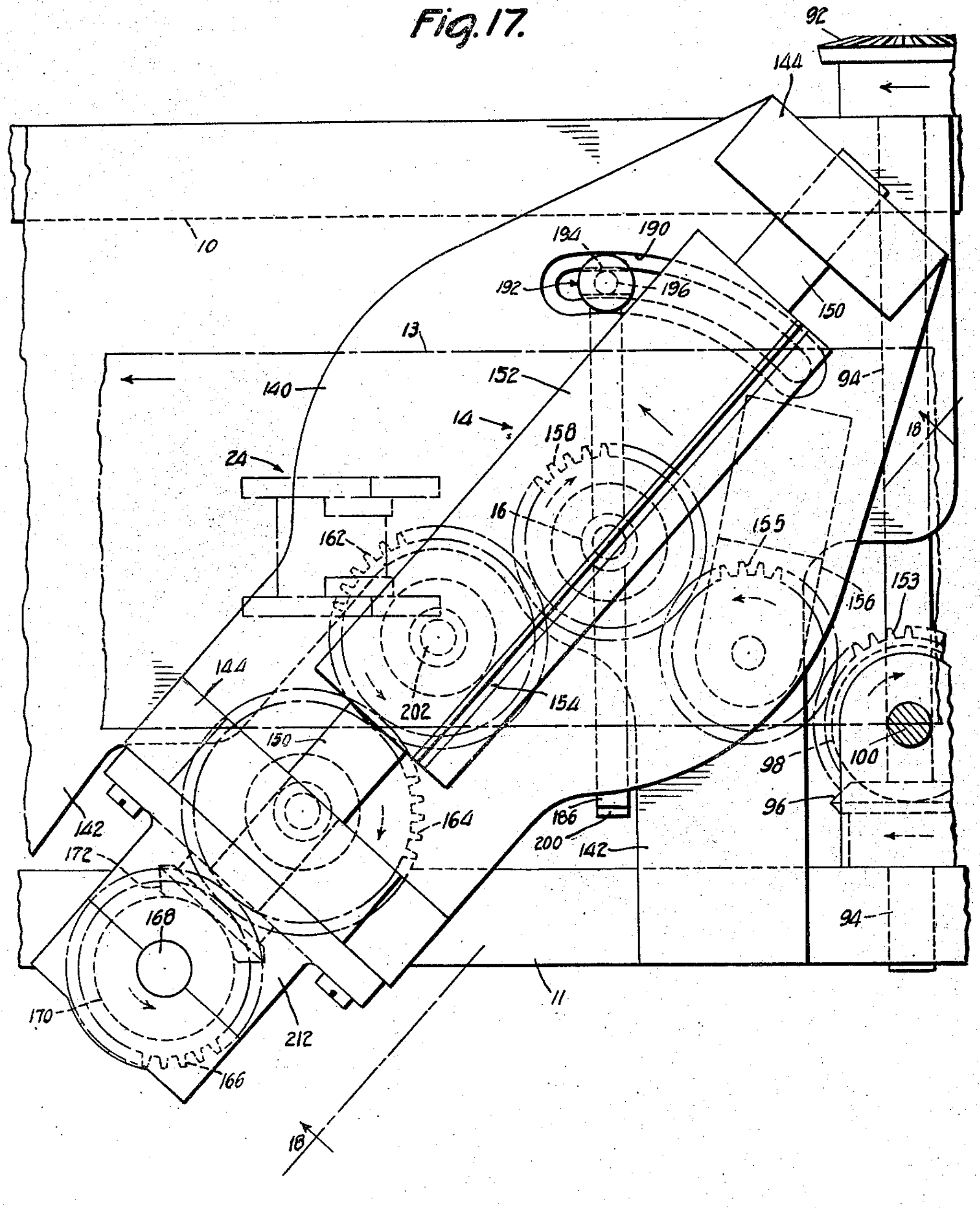
Figure 18:
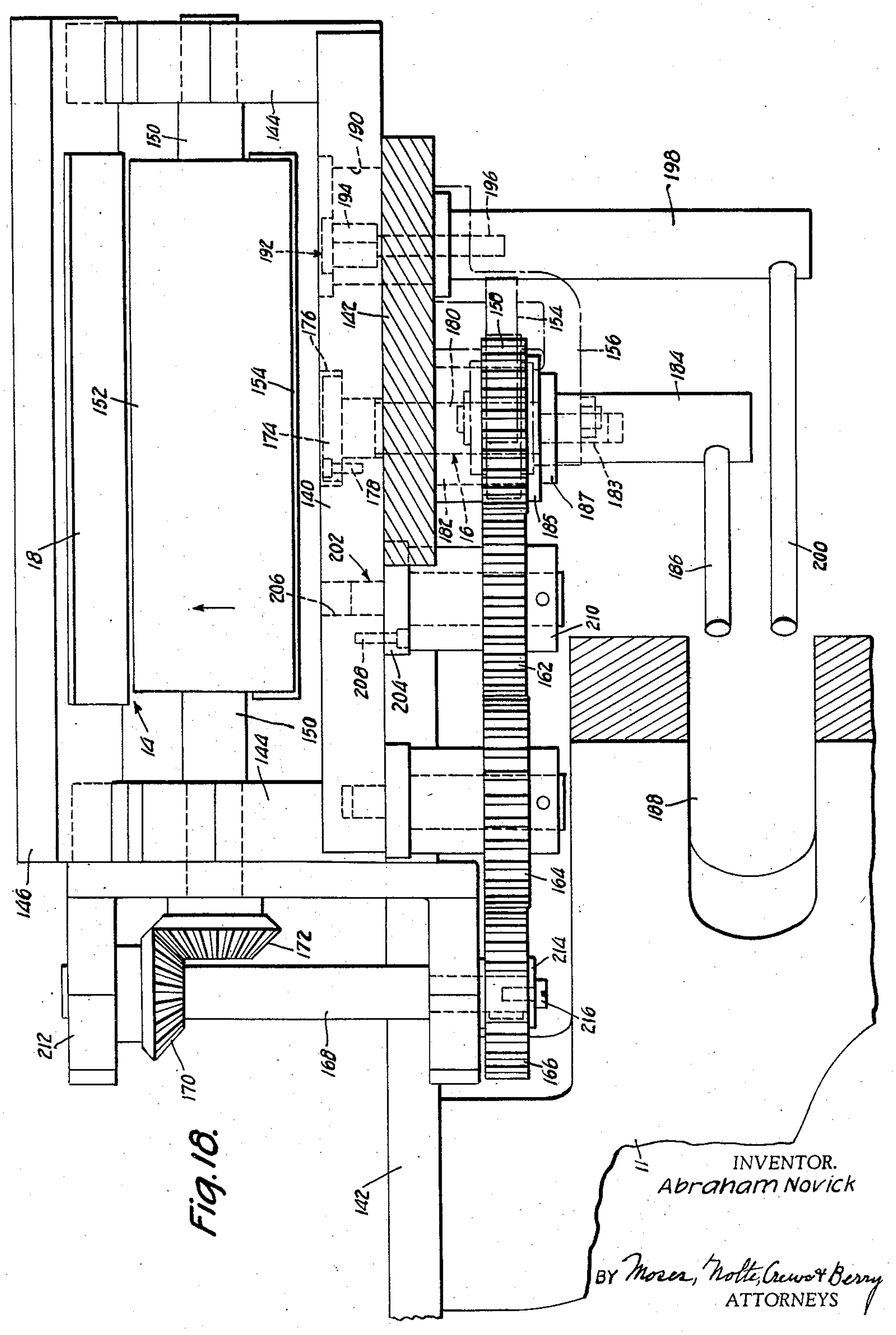
Figures 19, 20, 21, 22, 23, 24, 25, 26:
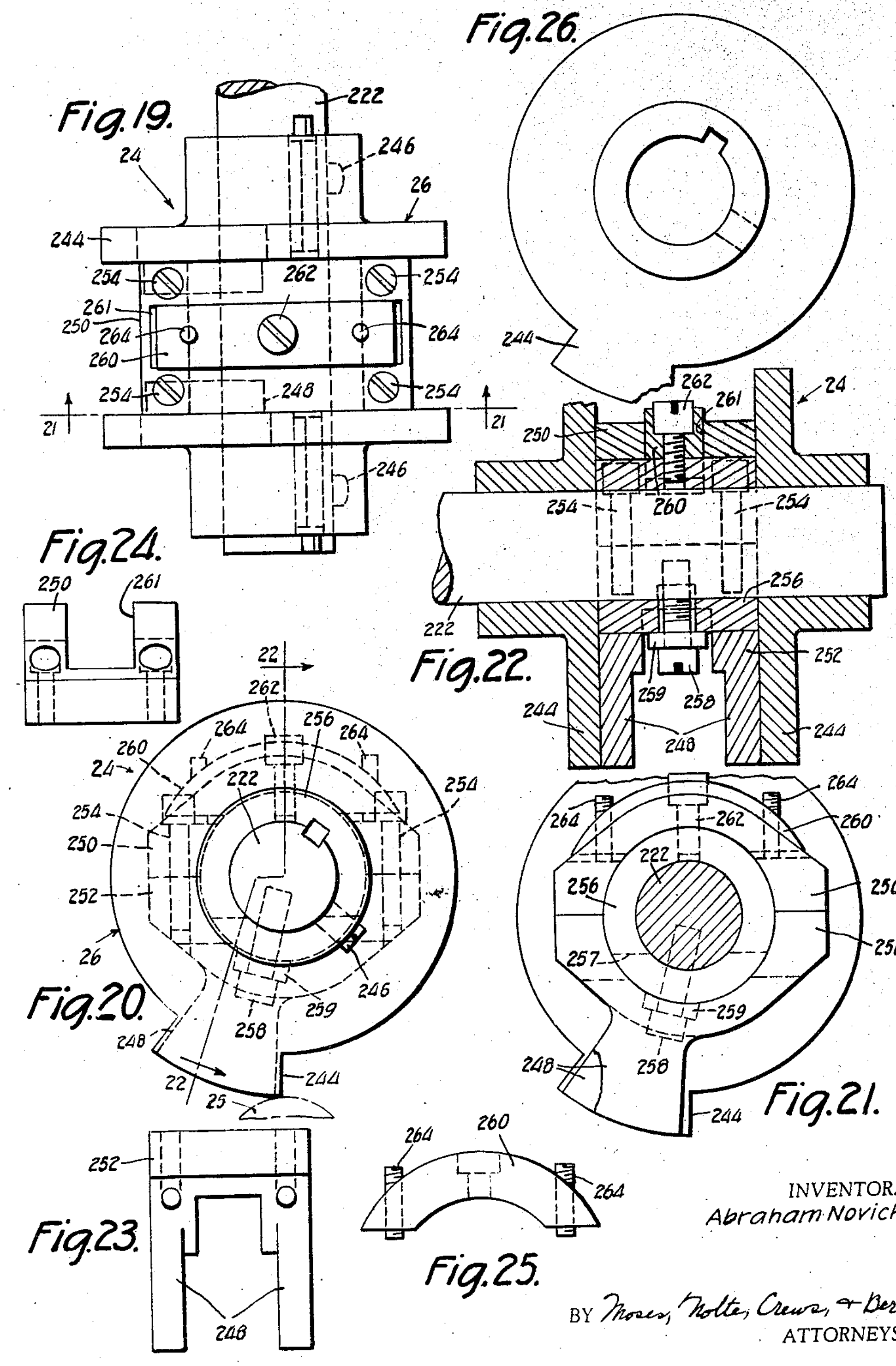
Figure 27:
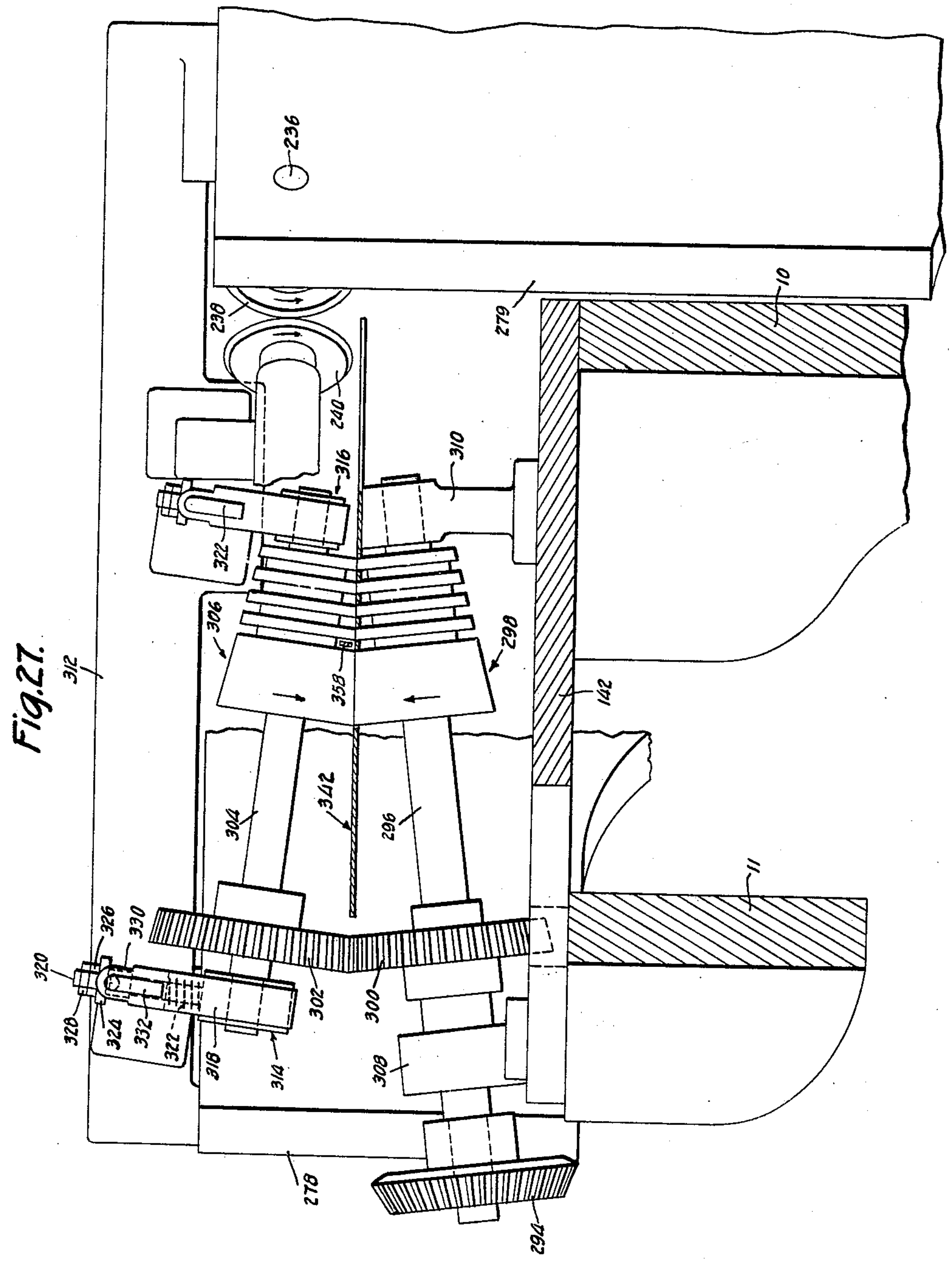
Figures 28, 29, 30, 31, 32, 33, 34:
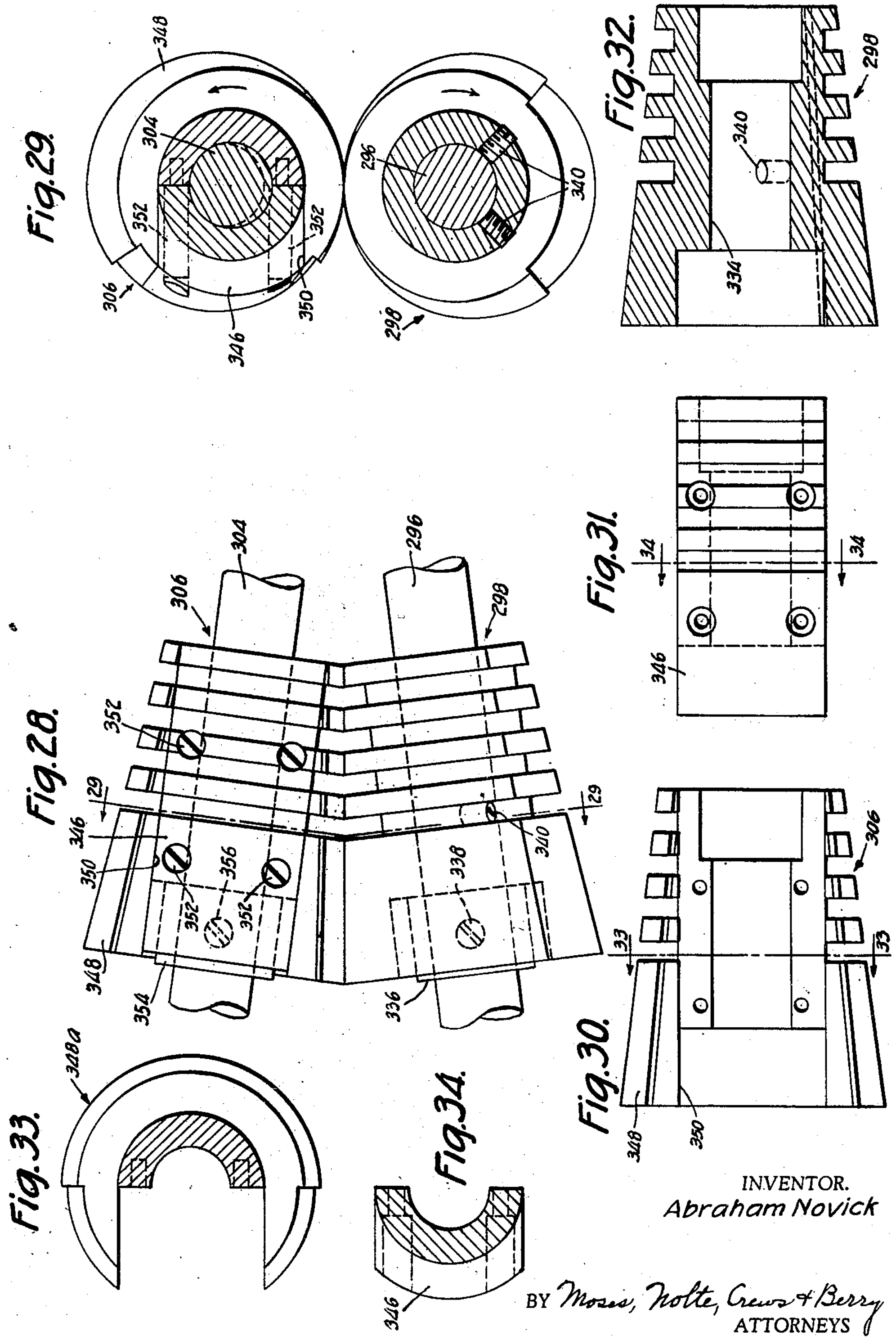
Figure 35:
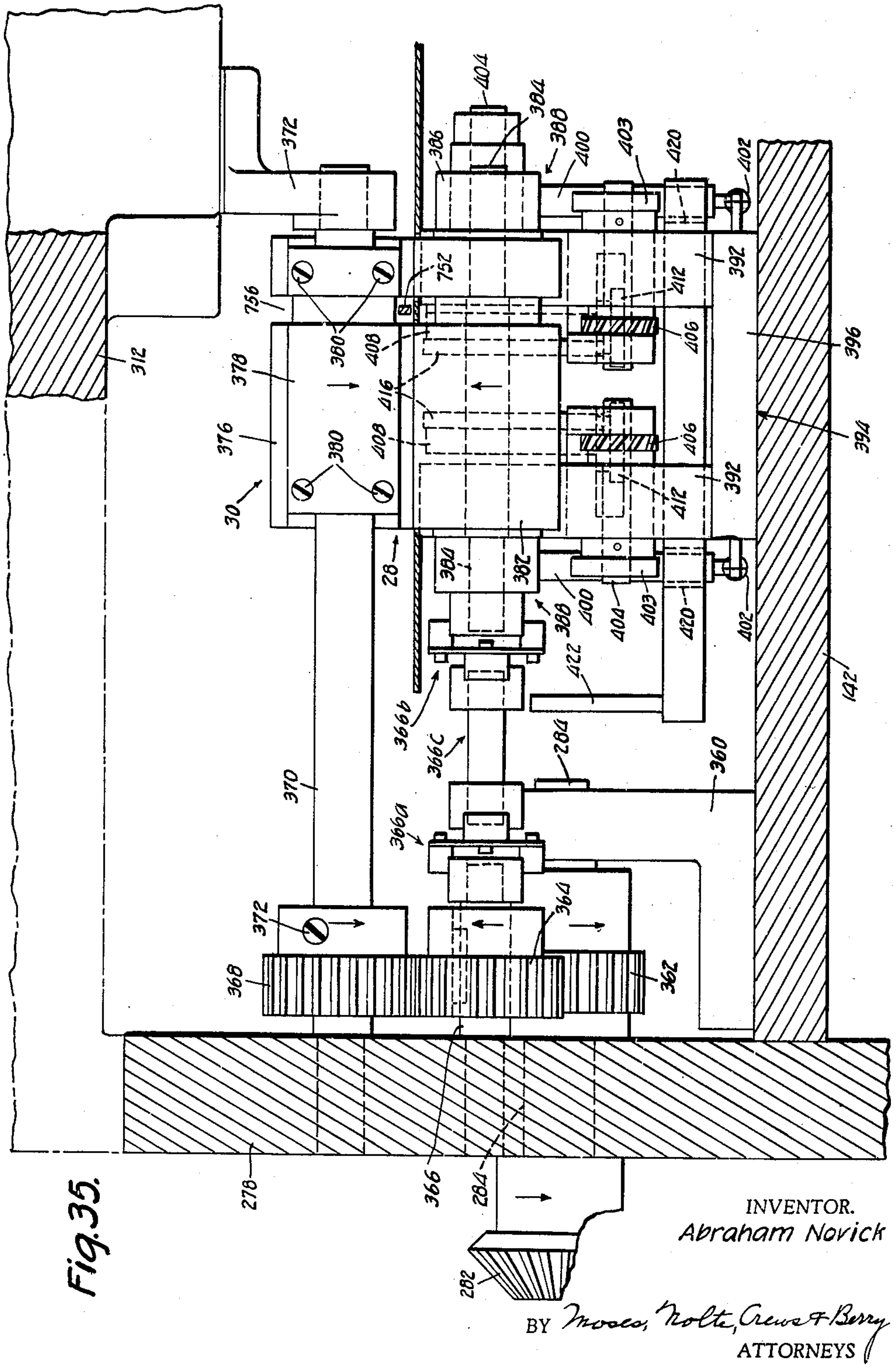
Figure 36:
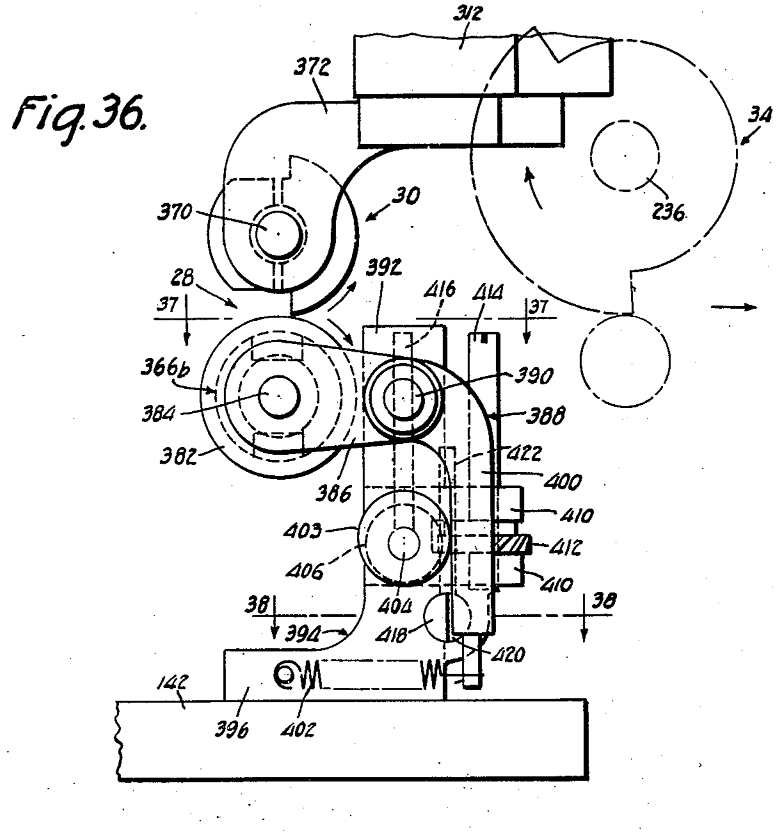
Figure 37:
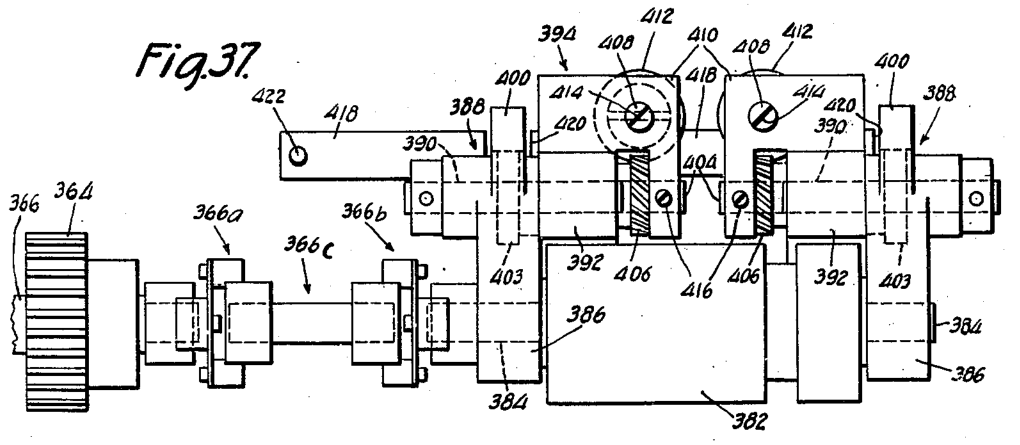
Figure 38:
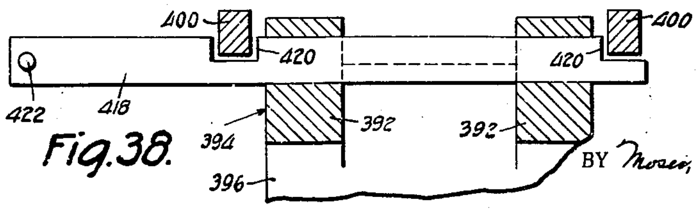
Figure 39:
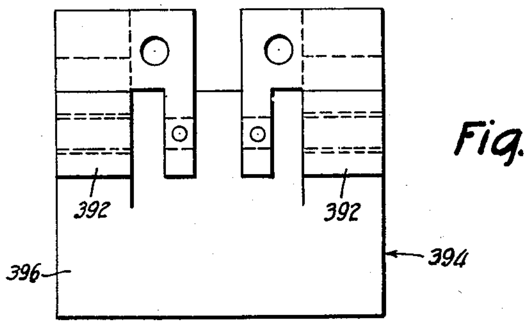
Figure 40:
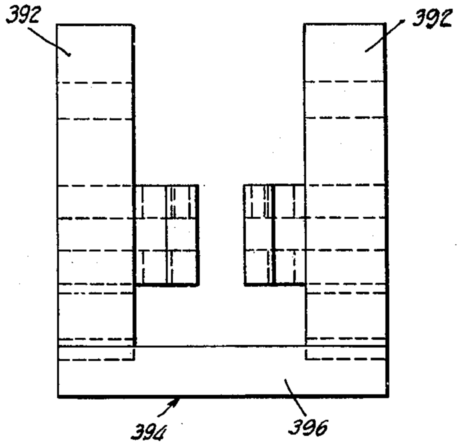
Figure 41:
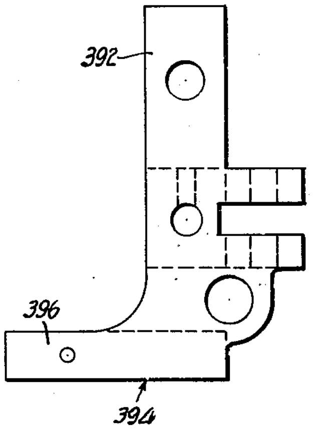
Figure 42:
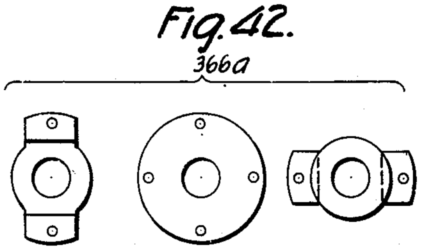
Figure 43:
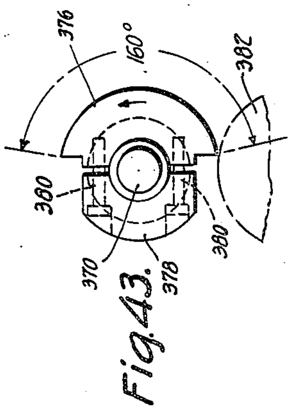
Figure 47:
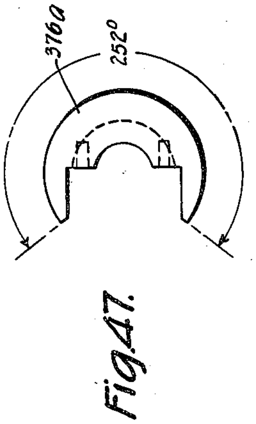
Figure 46:
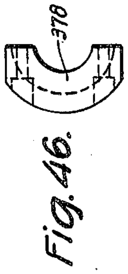
Figure 44:
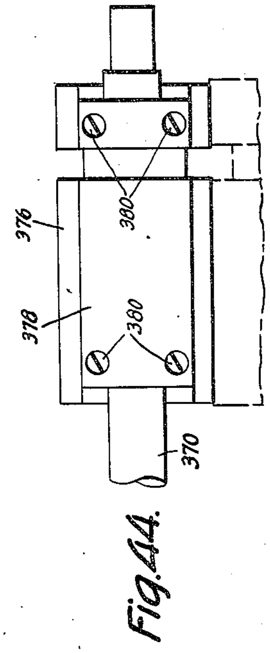
Figure 45:
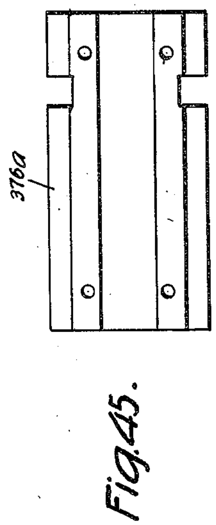
Figures 48, 50:
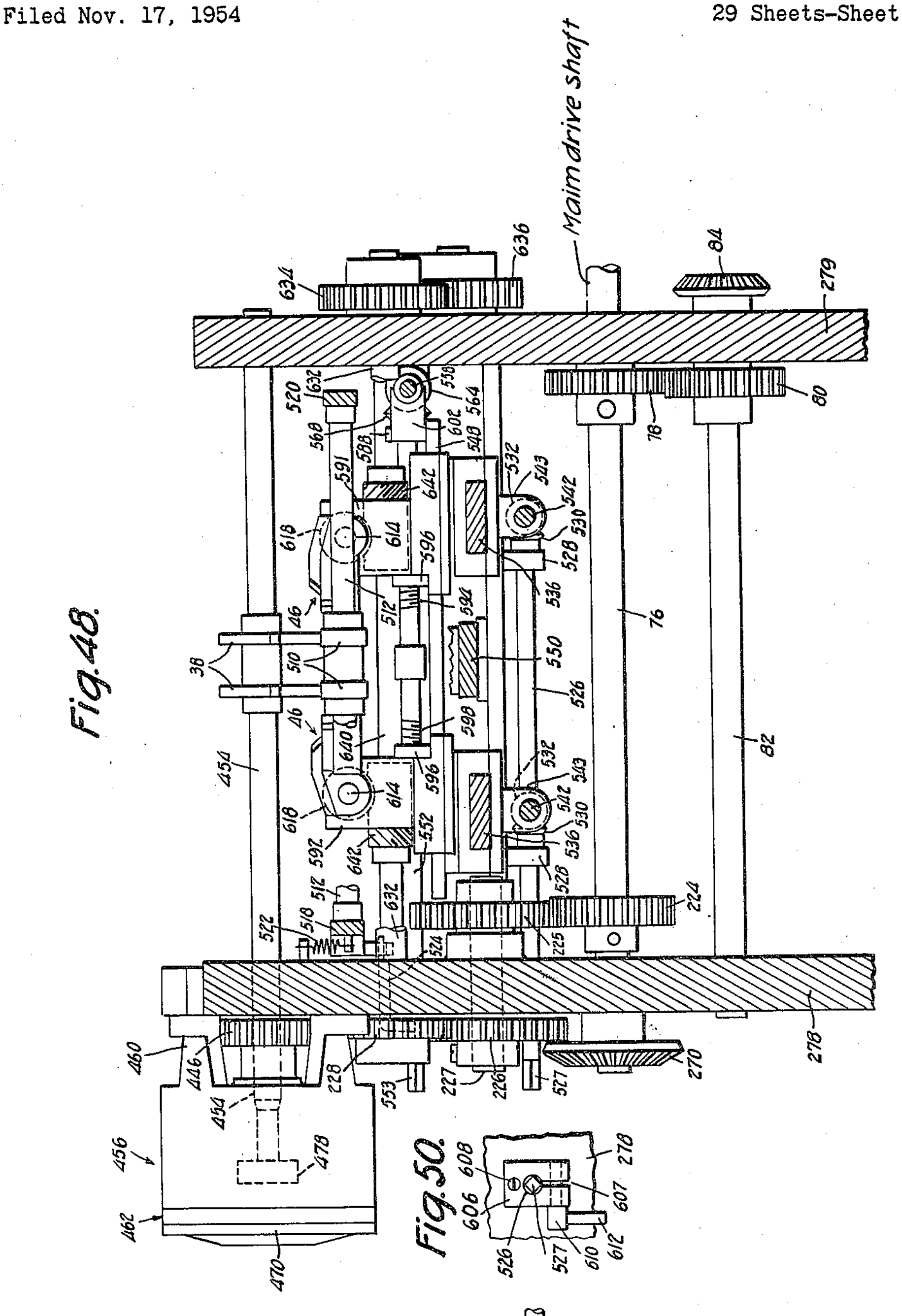
Figure 49:
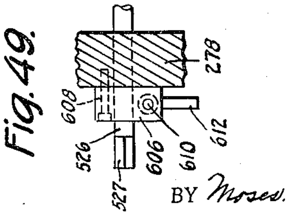
Figure 51:
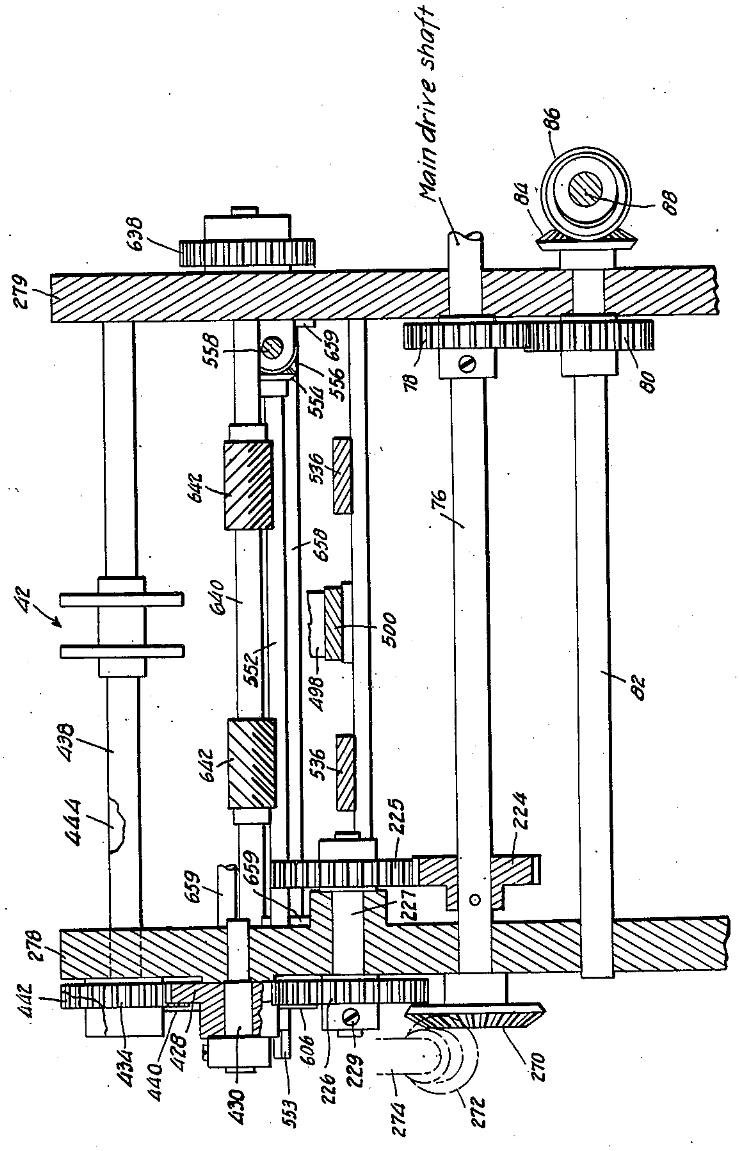
Figures 52, 53:
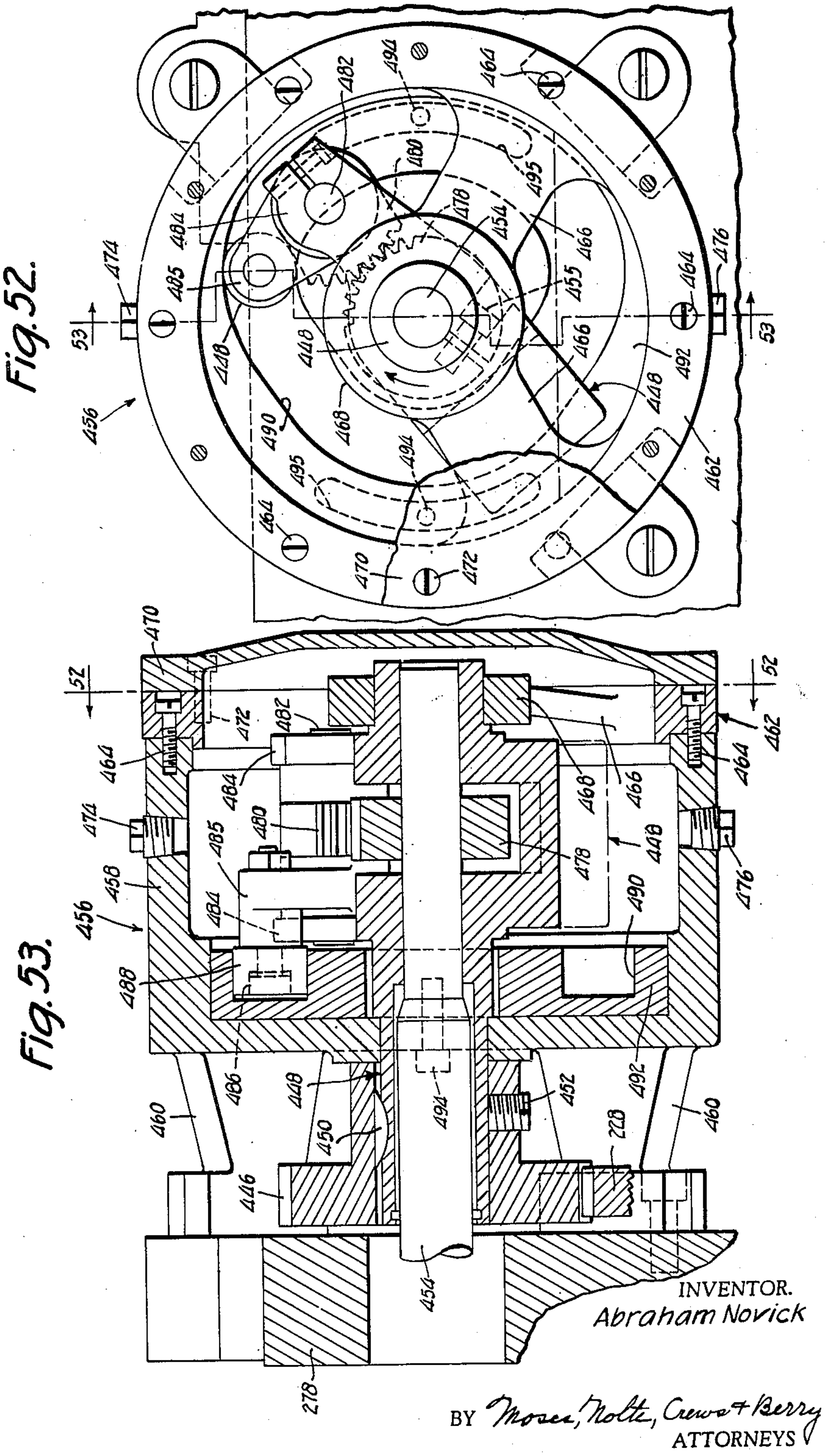
Figure 55:
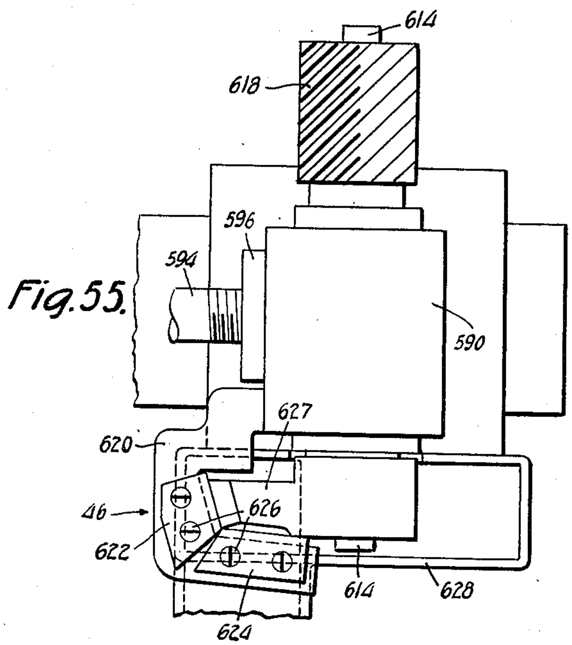
Figure 56:
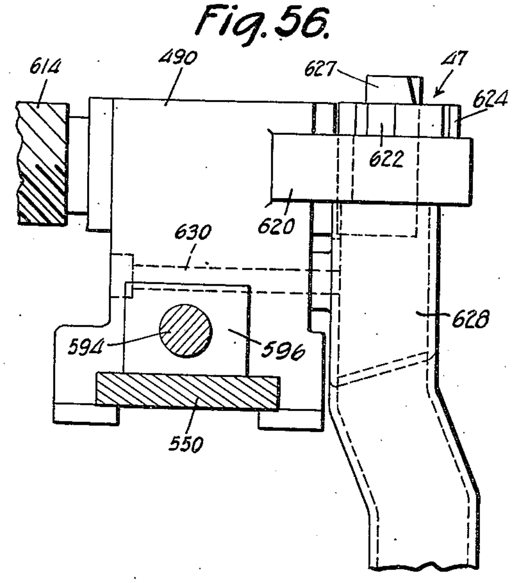
Figure 54:
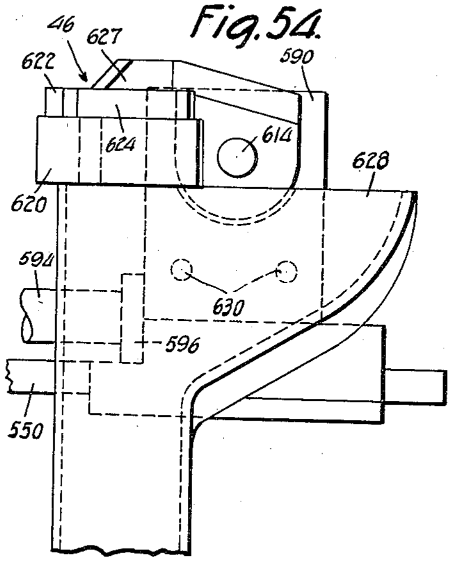
Figure 57:
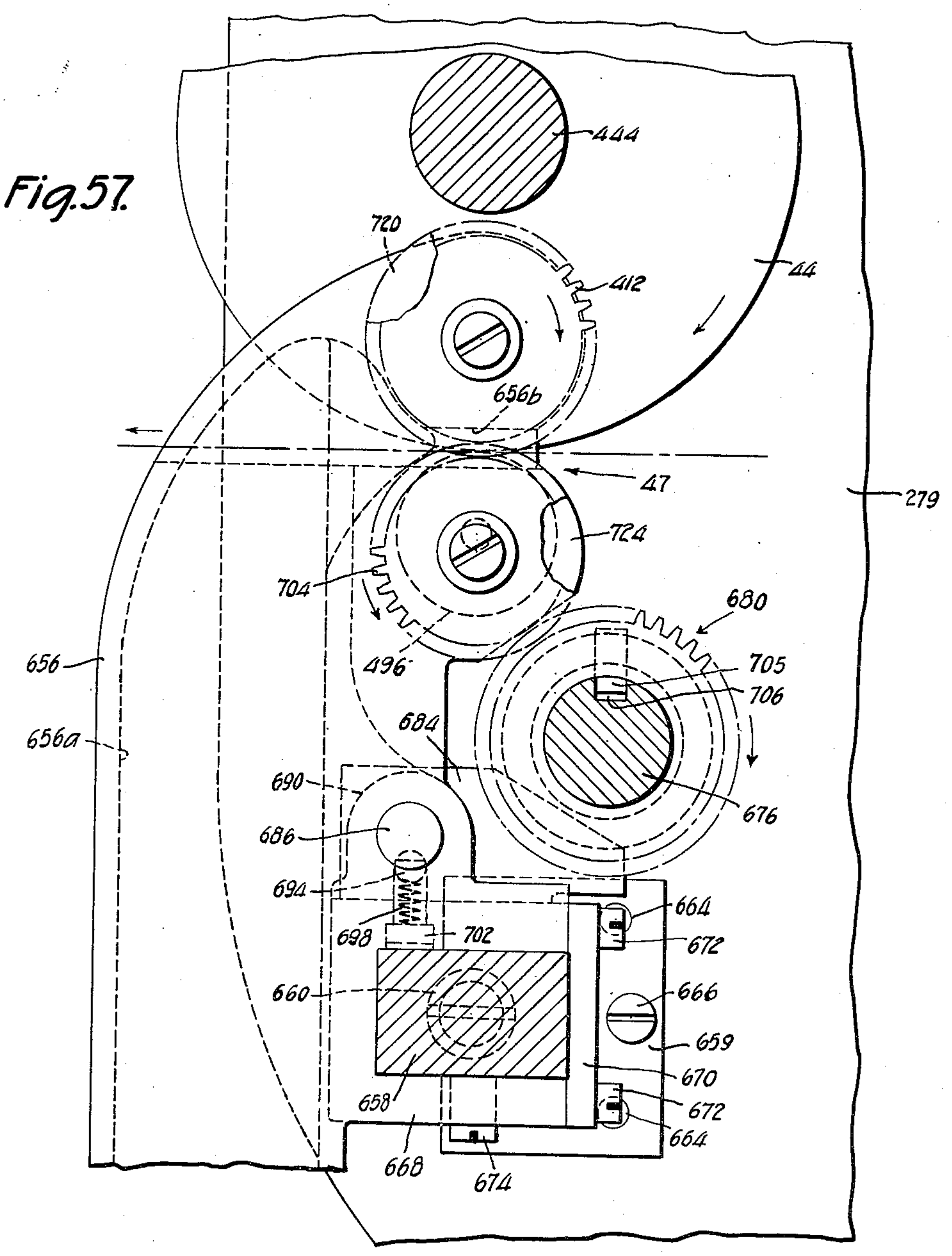
Figure 58:
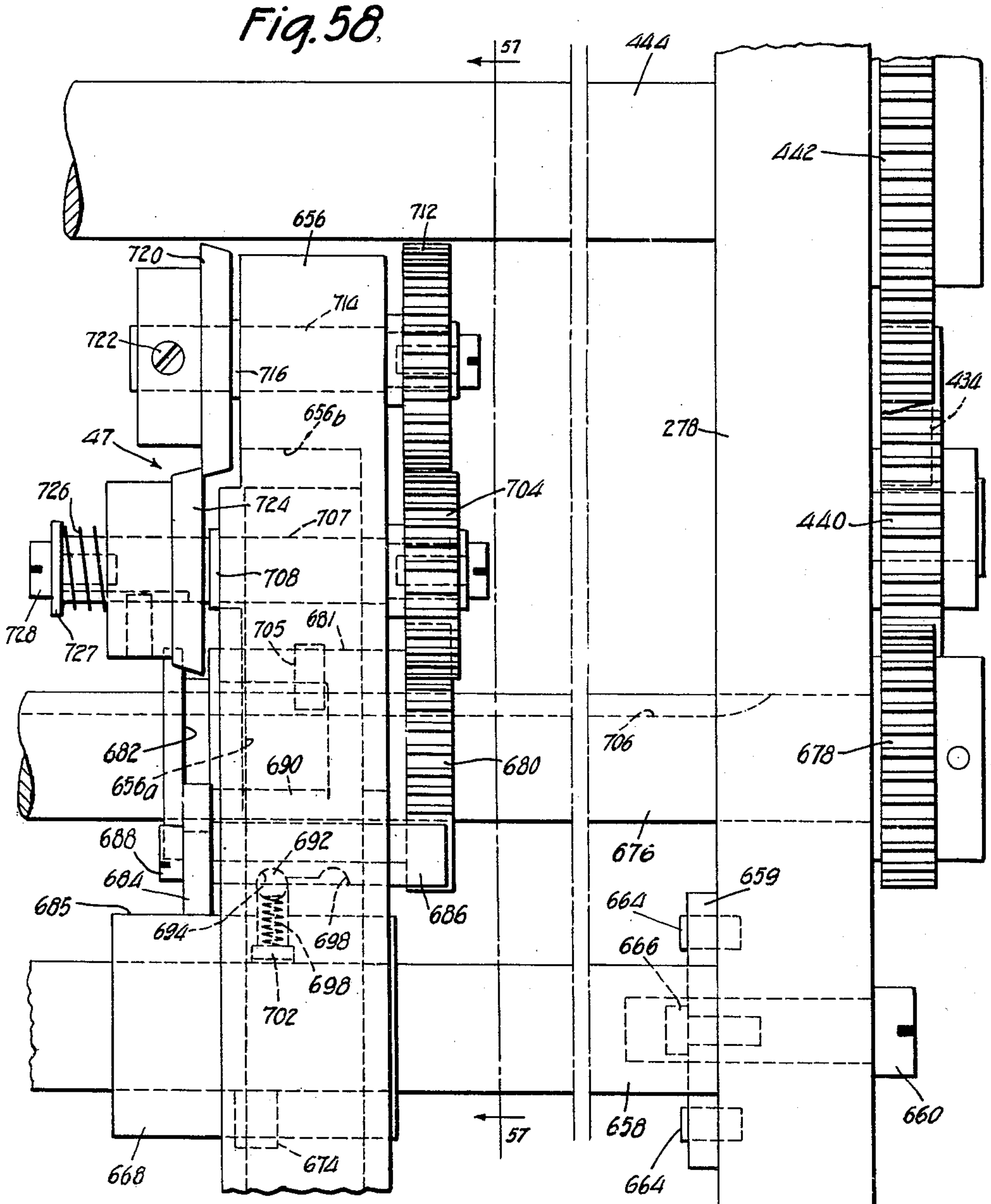
Figure 59:
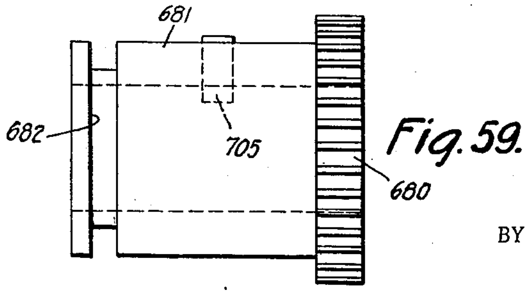
Figure 61:
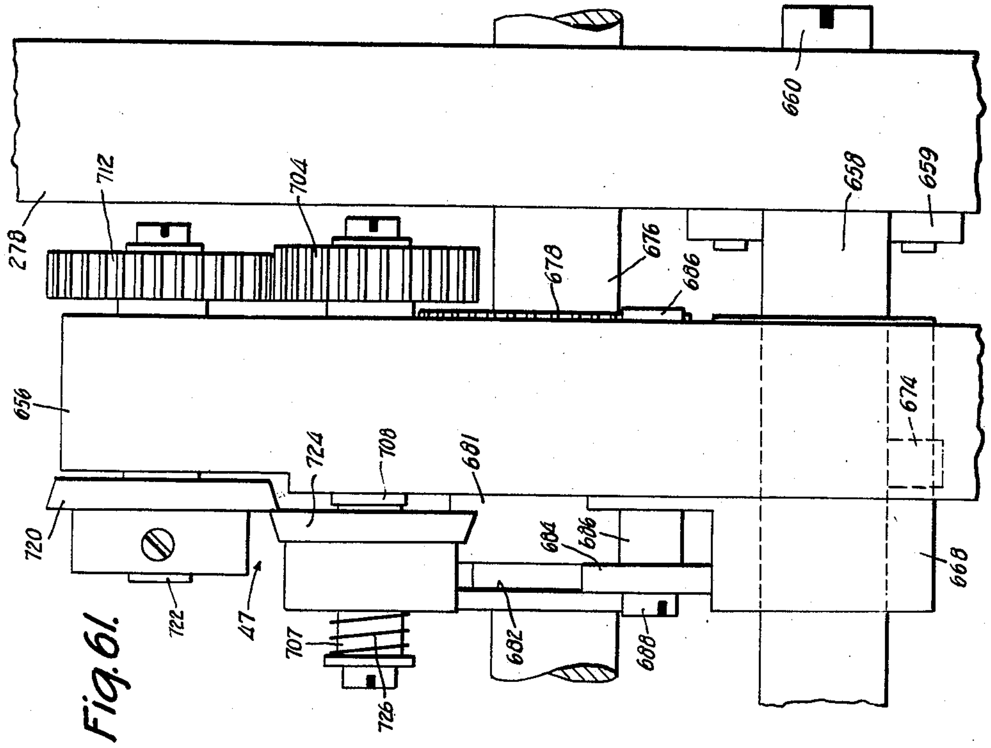
Figure 60:
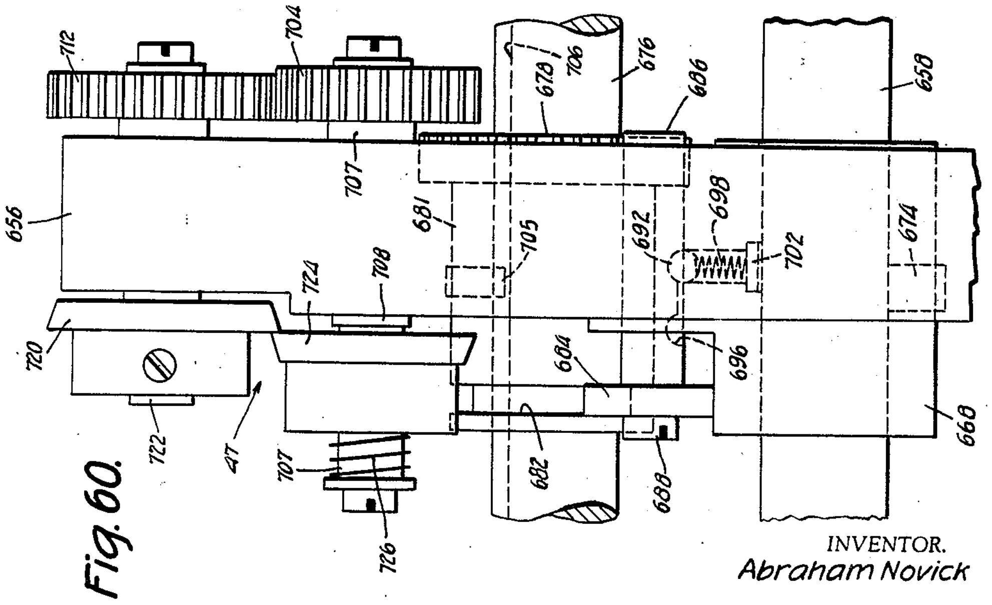
Figure 63:
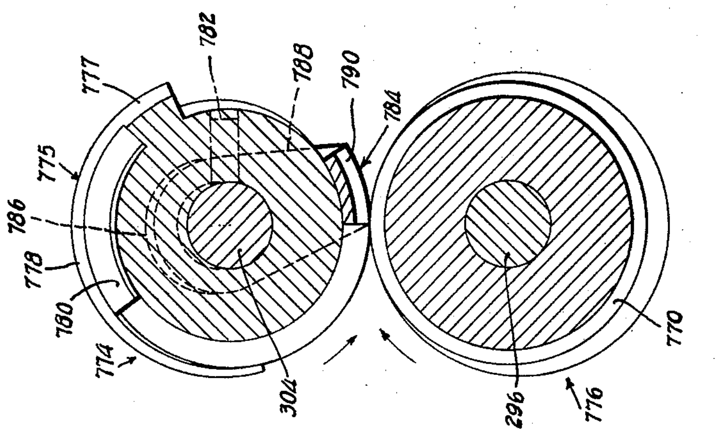
Figure 62:
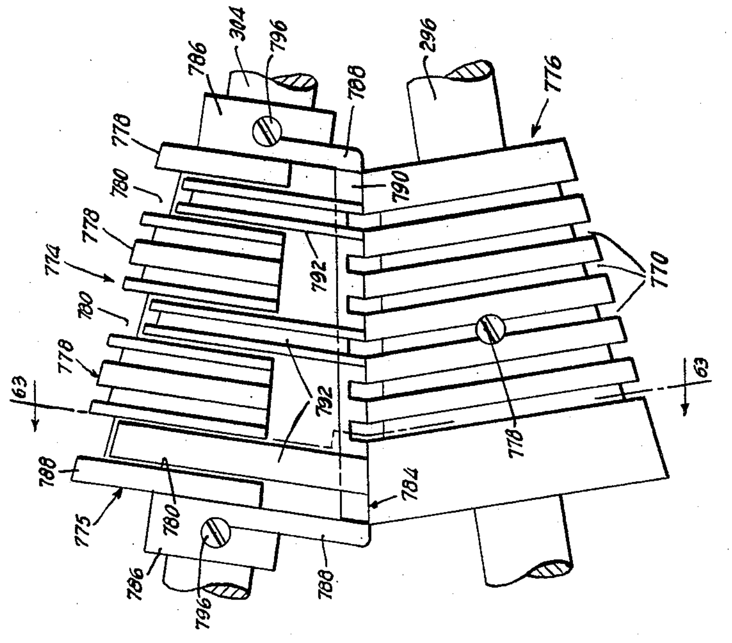

Figures 3 and 3*a* show upon a considerably enlarged scale envelopes which may be made from the blanks of Figure 1;

Figure 4 is a fragmentary diagrammatic plan view which shows some details which were omitted in Figure 1, but which also omits some details which are shown in Figure 1, the view illustrating a different size and shape of blank being processed;

Figure 5 is a fragmentary view in sectional elevation showing particularly web feeding and cutting and blank feeding and turning mechanisms at the introductory end of the machine;

Figure 6 is a fragmentary view in end elevation showing particularly drive gearing for the web;

Figure 7 is a fragmentary vertical sectional view taken on the line 7—7 of Figure 5, looking in the direction of the arrows;

Figure 8 is a fragmentary detail sectional view taken on the line 8—8 of Figure 6, looking in the direction of the arrows;

Figure 9 is a fragmentary view of the attachment mechanism in side elevation as seen from the operator's side of the machine;

Figure 10 is a fragmentary vertical sectional view, the section being taken on the line 10—10 of Figure 14, looking in the direction of the arrows;

Figure 10A is a detail side view of a feed roll release mechanism;

Figure 11 is a fragmentary view in elevation, the point of observation being indicated by the line 11—11 of Figure 12, looking in the direction of the arrows;

Figures 12 and 13 are complementary plan views showing the attachment mechanism, some parts being omitted however in order to avoid confusing the drawing with excessive detail;

Figure 14 is a fragmentary plan view similar to Figure 13 but showing the mechanism more completely and on a larger scale than Figure 13;

Figure 15 is a detail view of one of the gears in Figure 14 and its connection to its drive shaft;

Figure 16 is a fragmentary sectional view taken on the line 16—16 of Figure 10, looking in the direction of the arrows;

Figure 17 is a fragmentary plan view showing particularly the cutting unit and associated mechanism;

Figure 18 is a detail view in sectional elevation, the section being taken on the line 18—18 of Figure 17, looking in the direction of the arrows;

Figure 19 is a fragmentary plan view showing particularly a feed segment employed in advancing blanks from the cutter to the cone turner;

Figure 20 is an end view as seen from the lower end of Figure 19;

Figure 21 is a fragmentary sectional view taken on the line 21—21 of Figure 19, looking in the direction of the arrows;

Figure 22 is a fragmentary, sectional view taken on the line 22—22 of Figure 20, looking in the direction of the arrows;

Figure 23 is a detail view in elevation of one of two complementary segment members as seen from the left in Figure 20;

Figure 24 is a view similar to Figure 23 showing the other complementary segment member;

Figure 25 is a detail view showing in side elevation a segment adjusting member;

Figure 26 is a fragmentary view in side elevation showing one of two fixed segment members, as seen from the lower side of Figure 19;

Figure 27 is a fragmentary sectional view taken on the line 27—27 of Figure 12, looking in the direction of the arrows;

Figure 28 is a fragmentary detail view showing the turning cones in elevation;

Figure 29 is a sectional view of the cones, the section being taken on the line 29—29 of Figure 28, looking in the direction of the arrows;

Figure 30 is a detail view of one of two complementary members of the upper cone;

Figure 31 is a view similar to Figure 30 showing the other complementary cone member;

Figure 32 is a longitudinal vertical sectional view of the lower cone;

Figure 33 is a sectional view taken on the line 33—33 of Figure 30, looking in the direction of the arrows;

Figure 34 is a sectional view taken on the line 34—34 of Figure 31, looking in the direction of the arrows;

Figure 35 is a sectional view taken on the line 35—35 of Figure 12, looking in the direction of the arrows, the view however being on a larger scale than Figure 12;

Figure 36 is a fragmentary view in side elevation showing features of the blank feeding mechanism which immediately follows the cone, the view being taken from the side of the machine opposite the operator;

Figure 37 is a plan view of the mechanism shown in Figure 36 below the plane of blank feeding, the point of view being indicated by 37—37 of Figure 36;

Figure 38 is a horizontal sectional view taken on the line 38—38 of Figure 36, looking in the direction of the arrows;

Figures 39, 40 and 41 are respectively plan, end and side views of a bracket employed for supporting a portion of the blank feeding mechanism illustrated in Figure 36;

Figure 42 is a dispersed view showing the elements of one of two universal joints illustrated in Figure 37;

Figure 43 is a view in end elevation of a segment employed in feeding the blanks immediately after turning;

Figure 44 is a view of the same segment as seen from the left in Figure 43;

Figure 45 shows in elevation one of two complementary members which compose the segment of Figures 43 and 44;

Figure 46 shows in elevation the other of two complementary segment members;

Figure 47 shows a segment member which may be substituted for the member of Figure 45 when a greater length of feed is required;

Figure 48 is a transverse vertical sectional view taken on the line 48—48 of Figure 9, looking in the direction of the arrows;

Figures 49 and 50 are fragmentary detail views showing locking mechanism for locking the notcher carriers in adjusted positions;

Figure 51 is a transverse vertical sectional view taken on the line 51—51 of Figure 9, looking in the direction of the arrows;

Figure 52 is a fragmentary sectional view showing driving details of variable speed blank feeding means which bring the blank to rest for the action of the notching cutters, the section being taken on the line 52—52 of Figure 53, looking in the direction of the arrows;

Figure 53 is a fragmentary sectional view taken on the line 53—53 of Figure 52, looking in the direction of the arrows;

Figure 54 is a fragmentary sectional view showing a notching cutter and associated chip collecting mechanism, the section being taken on the line 54—54 of Figure 14, looking in the direction of the arrows;

Figure 55 is a fragmentary plan view showing the mechanism of Figure 54;

Figure 56 is a view similar to Figure 54 but taken at right angles thereto;

Figure 57 is a fragmentary sectional view taken on the line 57—57 of Figure 58, looking in the direction of the arrows, and showing particularly driving details of the corner trimmers;

Figure 58 is a fragmentary view in end elevation of the mechanism shown in Figure 57;

Figure 59 is a detail view of one of the corner trimming elements;

Figures 60 and 61 are fragmentary views in elevation showing corner trimmer details;

Figure 62 is a fragmentary view in elevation showing a modified form of cone turner; and Figure 63 is a sectional view taken on the line 63—63 of Figure 62, looking in the direction of the arrows.

The structure will first be briefly outlined by reference to diagrammatic Figure 1, and certain principles will be made clear by reference to the diagrammatic figures, after which the structure of the several parts will be described in detail.

In Figure 1 a frame comprising parallel side members 10 and 11 supports web feeding mechanism which includes a feed roller 12. The web 13 is always fed in the direction of a feed line AB and with its center line in coincidence with the line AB. A flying cutter unit 14 comprises substantially straight rotary and stationary blades 15, and is supported for adjustment as a unit about a pivot indicated at 16 in Figure 1. The center of pivotal adjustment is located in vertical alignment with the mid-point of the stationary cutter blade 18.

The flying cutter is designed to cut rhombic blanks 20 from the web. The length of web fed in an operating cycle of the flying cutter will necessarily determine the length of two opposite edges of the blank. The flying cutter is operated at invariable speed for blanks of all sizes and shapes, but the rate of web feed is adjusted to be equal to the prescribed length of an edge of whatever rhombic blank is desired. The angle of cut is dictated by the required shape of the blank. The web width must be chosen according to the known angle of cut to cause the two obliquely cut edges of the blank to be equal in length to the two edges which are initially edge portions of the web. By correctly coordinating web feed, web width and angle of cut, rhombic blanks of a wide variety of sizes and shapes can be produced.

When a blank 20 has been cut it is necessary that it be advanced and turned to cause its fore and aft diagonal to be located in coincidence with, and to be fed along, a central blank feed line CD for notching. For purposes of distinguishing the blank diagonals, the diagonal which is brought into coincidence with the line CD is herein referred to as the fore and aft diagonal, and the other diagonal, which is disposed at right angles thereto, is referred to as the transverse diagonal. As shown, the blank feed line CD makes an angle of 105° with the web feed line AB. While other relative directions could have been chosen, there is no provision in the machine for varying the direction of AB relative to CD.

At the instant of cutting the fore and aft diagonal of the blank extends along the bisector of the obtuse angle formed between the stationary knife and the right edge of the web as seen in Figure 1. The bisector EF is indicated in Figure 1, and a line FG is drawn through F parallel to the blank feed line CD. The angle EFG measures the amount that the blank must be turned in order to bring its fore and aft axes into coincidence with the blank feed line CD. The angle EFG is determined solely by the shape of the blank.

Since the angle EFG will be different for each different shape of blank it is necessary that turning mechanism 22 be provided which is capable through adjustment of turning the blank automatically through any desired angle throughout a wide range.

It is necessary, of course, to get the blank from cut position into position to be turned. For that purpose a blank feeding mechanism 24 is provided which comprises a complete lower roller 25 (Fig. 5) and an upper adjustable segment 26. Before cutting the leading end of the web is fed between the roller and the segment into position to be gripped by them the instant that the segment becomes active (engages the paper). The segment is driven at a faster peripheral speed than the highest web feeding speed of the web feed roller 12 so that the cut blank is carried forward in the direction of web feeding but is pulled away from the leading edge of the web which follows it. The segment 26 consists of complementary sections which are overlapped. One of the sections is fixed with reference to its drive shaft and always engages the blank precisely at the instant of cutting to initiate the blank advance. The other segment section, through suitable adjustment, determines the extent of advance of the blank by the feeding mechanism 24, so that the blank will be delivered free by such mechanism precisely as the blank reaches the point at which turning should begin.

As will be pointed out, the point at which turning is initiated is identified by reference to a point in the fore and aft diagonal of the blank. The location of that point in the blank at the beginning of turning, and hence at the conclusion of feeding by the mechanism 26, is not changed by a change in the size of the blank so long as the shape of the blank remains the same, but it is changed by a change in the shape of the blank. The center of each blank may be used as a reference point. This reference point lies in the fore and aft diagonal of the blank and the center of a blank is invariably just one half the length of a blank edge in advance of the stationary blade 18 at the instant of cutting. The location of this reference point in the blank at the beginning of feeding by the mechanism 26 is varied, therefore, in accordance with the length of a blank edge (rate of web feeding), while the location of the reference point of the blank at the beginning of turning is varied in accordance with the shape of the blank. Adjustment of the adjustable section of the segment 26 satisfactorily takes care of both these variables. The fixed segment will initiate the feeding of the blank at the instant of cutting, regardless of the position of the reference point, and adjustment of the other segment will control the extent of feed.

The conical turning mechanism 22 comprises upper and lower opposed conical segments whose apices are located at the point H. It is necessary that the cones be able to vary the point in a cycle at which the blank is seized by them and the point at which it is released by them. The cones are not therefore made as complete cone frusta but as cone segments. The blank is gripped by the cones only during the period in which the segments engage each other. By adjusting the segments relative to the shafts on which they are mounted so that one of the segments comes into blank engaging position at the instant when turning should commence and the other runs out of blank engaging position at the instant when turning should cease, various desired angles of turn may be effected which are precisely adjusted to the work in hand.

It is not essential that the cones be disposed exactly as shown in the drawing, but the arrangement shown has been found an advantageous one from the standpoint of avoiding interference and of securing operative continuity throughout a wide range of blank sizes and shapes. Every point of the blank will turn about the apex point H as a center as long as the blank is gripped between the cone segments. The half apex angle of the cones is, as shown, 7½°. The sine of 7½° is approximately one-eighth. The angle of blank turning will be, therefore, approximately one-eighth of the angle (measured about a cone axis as a center) through which the segments turn in driving the blank. A square blank requires to be turned through thirty degrees and therefore requires that the cone segments cooperate throughout substantially 240° of rotation. The blank of Figure 1 requires a relatively small angle of turning and requires a proportionately smaller angle of cooperation of the cone segments. The angle of turning required for the blank of Figure 1 is between nine and ten degrees, so that the angle of cone drive to effect that turning is in the neighborhood of 75°.

The points at which the turning should be begun and terminated may be ascertained as follows:

As has been noted the lines AB and CD make an angle of 105° with one another. A line HI, is drawn through H which makes an angle of 52½° (half of 105°) with the line CD, this line cutting CD at K. As shown, the line HI lies in the common axial plane of the cones, but this is not a necessary relationship. Through K a line is drawn parallel to the web feed path. As the machine is illustrated this line coincides with the center line of web feeding AB which has already been drawn, but this is not a necessary relationship. The turn angle EFG is bisected, and the half angle is laid out at opposite sides of HI with H as a vertex. One boundary line HM intersects AB at M and the other boundary line HN intersects CD at N. An arc drawn from M to N with H as a center measures the correct angle of turning. The point of intersection of the fore and aft diagonal with the line AB should be located at the point M as the turning is begun. It will then be located at the point N in the line CD as the turning is concluded. Since the blank will have been turned through the proper angle of turn and the point of the fore and aft diagonal which started at M is now definitely located at N in the line CD, the entire fore and aft diagonal must coincide with the line CD. If the blank has been larger or smaller the points M and N would still have been in the same locations, but if the blank had been nearer to square in shape the turn angle would have been greater, and the points M and N would have been spaced farther from the point K along the lines AB and CD, respectively.

It is now evident that the mechanism 24 is required to advance the point of the blank whcih lies at the intersection of the fore and aft diagonal with the line AB from the position occupied by that point at the instant of cutting to the point M, and that the cone turner 22 must advance the same point of the blank from M to N along an arc equal to the turn angle and having its center at H.

The segment 26 and the feed roller 25 which opposes it are turned at the rate of one revolution per cycle. The linear feed rate of the mechanism 24 is greater than the maximum web feed rate for which the web feeding mechanism can be adjusted. The trailing edge of a cut blank is therefore pulled away from the remaining web and no problem of interference can arise while the blank is being advanced by the mechanism 24.

The cones, however, present a different situation. The maximm cone diameter is substantially equal to the diameter of the segment 26. If the cones made just one revolution per cycle, points of the blank lying nearer to the turning center H than the large end of the cone do would travel linearly at a closer rate than the following blank which is being driven by the mechanism 24, and in the direction of web feeding the component of movement of the slower moving portions of the turning blank would be considerably less than the movement of the following blank. In order to avoid interference the cones are geared to make two revolutions per cycle.

With the cones making two revolutions per cycle it is evident that the cone segments will run in contact for the necessary turning period at the beginning of a cycle, and that they will repeat this operation starting exactly a half cycle, or one cone revolution later. This does no harm because the blank will always be turned, moved clear of the cone feed bight and of the oncoming blank during the first half cycle, while the second blank will never move into the feed bight of the cone until after the second period of cone segment engagement has been completed.

The point presents no substantial difficulty with the machine organized as shown. A relatively narrow blank (fore and aft) like that shown in Figure 1, requires relatively little turning so that the turning is quickly accomplished and sufficient time remains after turning to enable the blank to be moved completely clear of the cone feed bight before the second revolution of the cones begins. Although a blank of this shape reaches the cone feed bight comparatively early in the second revolution of the cones the period of cone segment engagement is so brief that the bight is clear to receive the blank before the leading edge of the blank reaches the bight. A square blank, which lies at the other extreme from the narrow blank of Figure 1, requires a more extensive turning, but it is moved almost clear of the feed bight by the cones themselves, and requires but a slight subsequent feeding to be moved clear of the bight. It can be moved clear of the bight in the first revolution of the cones. A square blank arrives relatively late in the second revolution of the cones to find the cone bight clear, notwithstanding the fact that the cones run in engagement with one another throughout substantially more than half of that revolution.

For square blanks upper and lower cone segments each of substantially 250° in circumferential extent are employed. These segments could be adjusted to produce a feed angle of as much as 250° (substantially 31¼° of turn angle). They can be adjusted however to produce smaller feed angles. Since their high parts add up to 500° (140° in excess of a complete circumference), the least feed angle with this combination of segments is 140° (a turn angle of approximately 17½°). By replacing one of the 250° segments with a segment of the order of 180°, the excess of the sum of the segments over 360° can be reduced to 70° or even less. If the substituted segment is of 180° extent this combination of 180° with 250° can be used to produce feed angles from 180° down to 70° (turn angles from substantially 22½° down to less than 9°).

Figure 2:
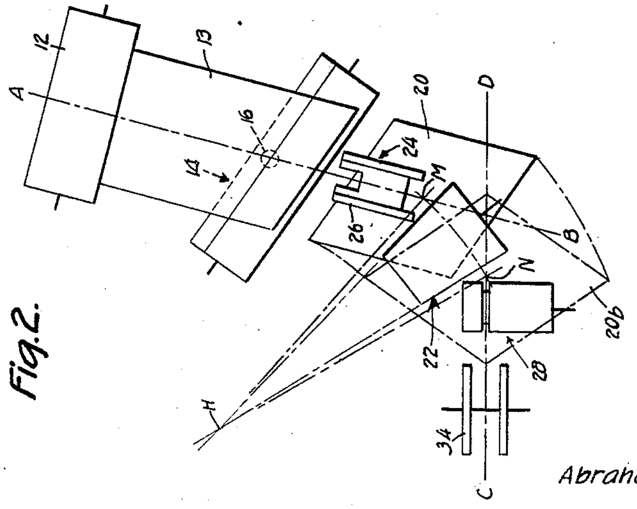
Figure 2 is a fragmentary diagrammatic plan view showing the web feeding and cutting, the blank advancing and the blank turning operations performed upon a less oblique rhombic blank than the blank of Figure 1.

A feed mechanism 28 is provided for feeding the turned blanks away from the cone turner 22 in the direction of the line CD the instant that the turning is completed. This mechanism comprises a complete lower roller and an upper feed segment 30. The segment 30 may be adjusted in phase relative to its shaft to seize the blank at the very instant the blank is released by the cones. The segment 30 is made of small diameter to enable its feed bight to be located near to the feed bight of the cones. The diameter of the segment 30 is one-half that of the segment 26, but it is driven through two revolutions per cycle, so that the two linear feed rates are the same. Blanks which are wide (fore and aft) extend well past the bight of the mechanism 28 (Fig. 2) before the turning is completed and require relatively little advance to clear the feed bight of the cones, and to carry them into the field of action of the following feeding mechanism. Blanks which are narrow (fore and aft) require a lesser angle of turn, are less advanced relative to the feed bight of the mechanism 28 at the completion of turning, and require to be advanced more extensively by the mechanism 28. A segment 30 having an effective arc of 160° (Fig.43) (⅘ of a cycle) is provided for blanks requiring relatively slight advance by the mechanism 28, and a substitute segment having an effective arc of 252° (Fig. 47) (7/20 of a cycle) is provided for blanks requiring more extensive advance by the mechanism 28.

A feeding unit 32 (Figs. 1 and 10) which follows the mechanism 28 comprises four segments, 34, 36, 38 and 40 and two rollers 42, 44. All these segments and rollers are of twice as great diameter as the segment 30. They are driven in common with rotary notching cutters 46 from a common drive member, which member may be adjusted in phase relative to the mechanisms 14, 22, 24 and 28. The segments 34, 36, 38 and 40 and the rollers 42 and 44 are driven at the rate of the one revolution per cycle (one half the rotary speed of the smaller 30). The segments 34, 36 and 40 and the rollers 42 and 44 are driven at constant speed, but the segment 38 is driven at variable speed, being adapted to slow down each blank to a condition of rest in a notching position, and then to accelerate the blank to normal speed before turning it over to the segment 40.

Since the segments 30 and 34 run at the same surface speed their engagements with a blank may be overlapped. Phase adjustment of the unit 32 may therefore be effected with the object of assuring a definite location of the transverse diagonal of the blank at the instant when the blank stands at rest for the action of the notching cutters upon the blank. When the transverse diagonal of a blank which is engaged by the mechanism 28 stands at a definite reference position, the correct phase relation of the unit 32 is known and can be set.

The forward and rear pairs of notching cutters (considered in the direction of blank travel) are always automatically located at equal distances from the axial plane of the segment 38, while the right and left pairs of notching cutters, located in the upper and lower portions of Fig. 1, are always automatically located at equal distances from the central blank feed line CD. This will be described in detail and explained at a subsequent point. The fact that the blanks are obliquely cut might be thought to produce blank dimensions unsuitable for producing envelope bodies of standard dimensions and whose linear dimensions increase progressively from the smallest to the largest by increments of one-eighth inch. Even though a blank may be slightly oversized for the envelope dimensions ordered, the irregularity introduces no error and does no harm, for the notches and scorers can be set for standard sizes, and any slight excess of blank size will then be taken care of by slightly increased areas of flap over-lap in the finished envelope.

It is important that the segment 38 take over control of the blank while running at normal or average speed and that it deliver control of the blank to the segment 40 while running at normal or average speed. This may be readily brought about for blanks of a wide variety of sizes because the segment 38 runs at average speed throughout a large part of its cycle.

The rollers 42 and 44 feed the blanks past end flap corner trimmers 47 and deliver them onto slow running tapes or belts 48, whereby they are carried in fanned out relation to the operating instrumentalities of a wide range, open side, rotary envelope making machine.

In Figure 3 disclosure is made on a considerably larger scale than Figure 1, of an envelope adapted to be made from the type of blank shown in Figure 1. The envelope comprises an elongated body 52, a bottom flap 54, a sealing flap 56, and overlapped end flaps 58, both of which have been corner trimmed. In Figure 3A, a similar envelope 50*a* is shown in which only one of the two end flaps 58*a* has been corner trimmed, the other flap 58*b* being left intact. The machine includes provision for disabling one or both of the corner trimmers when desired. This will be described in detail and explained at a subsequent point.

The web feeding mechanism is best illustrated in Figures 1, 4, 5, 6, 7, 8 and 12. This mechanism is carried by side frame members 10 and 11. A reel 62 (Fig. 5) of envelope stock is supported on a shaft 64 and supplies a web 13 of envelope material. The web is led over a guide roller 68, under a guide roller 70, over guide rollers 72 and 74, and around the feed rollers 12. A roller unit 75 is opposed to the roller 12 and forms a feed couple with 12.

The roller 12 is driven at different selected speeds from a constant speed main shaft 76 (Figs. 6, 7, 11, 12 and 51). The shaft 76 is clutch connected to be driven from the main shaft of a wide range rotary envelope making machine. Every operating part of the attachment unit is driven from the shaft 76. The shaft 76, through spur gears 78 and 80 drives a lower shaft 82. The shaft 82 through bevel gears 84 and 86 drives a shaft 88 supported by a fix bracket 89. The shaft 88, in turn, through bevel gears 90 and 92 drives a shaft 94. The shaft 94 through bevel gears 96 and 98 (Figs. 6 and 7) drives a vertical shaft 100. The shaft 100 through bevel gears 102 and 104 drives a horizontal shaft 106 on which a spur gear 108 is made fast. A change speed unit is interposed between the gear 108 and the shaft 110 of the roller 12.

An arm 122, pivotally mounted on the shaft 110, rotatively supports a spur gear 116. The gear 116 has driving engagement with a gear 118 which is fast on the shaft 110, and this engagement is maintained at all times even when the gear 116 is raised and lowered through swinging of the arm 112. The gear 108 is held on the shaft 106 by a set screw 120, and may be readily removed from the shaft 106 and replaced by another gear of different size when it is desired to change of the rate of web feed so that the length of web feed in a cycle will be changed. The arm 112 is formed with an arcuate slot 122. The shank of a screw 124 (Fig. 12) is passed through the slot and the adjacent frame member 11 and is threaded into a nut 125. The screw may be tightened by the nut to retain the arm 112 in position for maintaining the gear 116 in mesh with the gear 108 which is in service. In the illustrated machine as commercially manufactured, gears 108 of eight different sizes are provided for alternative use.

The gear 118 fast on the shaft 110 drives the roller 12. It also drives a gear 124*x* fast on a shaft 126, upon which shaft the roller unit 75 is also made fast. The shaft 126 is rotatably supported in swingable arms 128 (Figs. 6 and 7), which arms are supported upon pivot pins 130. The arms 128 are urged upward by compression coil springs 132, to maintain the roller unit 72 in bearing relation to the roller 12. The springs 132 are engaged at their upper ends with the arms 128 and at their lower ends with stationary abutments 134.

Provision is made of means for separating the roller unit 75 from the roller 12 when separation is desired, for example, when the machine is being supplied with a fresh reel of paper and must be rethreaded. A cylindrical rod 136 extends across the machine and is rotatably supported in the frame members 10 and 11. The rod has an end portion 138 bent off to serve as an operating handle. The rod is ground or cut half-way through to form flat faced notches 139 opposite the arms 128 for engagement or substantial engagement with the arms. By giving the rod a quarter turn or more, the rollers 75 may be cast off from engagement with the roller 12 and may be retained in cast off condition. Upon restoration of the rod to its normal position, the roller unit 75 is automatically returned into position to press the web against the roller 12.

The cutting unit 14 comprises a U-shaped frame or bracket 140 (Figs. 5, 12, 17 and 18) which is supported upon a stationary horizontal bed plate 142 for rotative adjustment above the vertical pivot pin 16. Upright end members 144 of the bracket 140 fixedly support a straight stationary bar 146 to which the stationary cutting blade 18 is affixed. The members 144 also rotatively support a shaft 150 upon which a cutting drum 152 is made fast. A rotary cutting blade 154 is carried by the drum 152 in position to protrude beyond the periphery of the drum and to co-act with the stationary blade 18 once in each revolution of the drum.

The shaft 150 is driven in unison with the main shaft 76, causing the rotary cutting blade to make one revolution per cycle. Drive for the shaft 150 is taken from the vertical shaft 100 (Fig. 6) through which the roller 12 is driven. A spur gear 153, fast on the shaft 100, drives a similar gear 155 which is rotatively supported in a bracket 156 affixed to the lower side of the plate 142. The gear 155 drives a gear 158 which is rotatively supported on the headed pivot pin 16. The pivot pin 16 defines the axis of rotative adjustment of the cutter unit frame 140, being vertically disposed with its axis in alignment with the mid-point of the stationary cutting blade 18. The gear 158, through horizontal gears 162, 164 and 166, all carried by the bracket 140, drives a vertical shaft 168. The shaft 168 through bevel gears 170 and 172 fast, respectively, on the shafts 168 and 150 drives the drum 152 and its cutter blade 154.

The pivot pin 16 has its head 174 fitted into a circular recess 176 of the base portion of bracket 140. A headed screw 178 has its shank passed downward through a marginal portion of the head 174 and threaded into the base member of the bracket 140 to fix the pin against rotation relative to the bracket.

The pin 16 has a shank portion 180 which extends downward through the base of the bracket 140, the stationary plate 142, and a flanged sleeve 182 on which the gear 158 is supported, and has a lower, threaded, reduced end portion 183 screwed into a flanged clamping nut 184. The sleeve 182 bears upward against the stationary plate 142. When the nut 184 is tightened, the stationary plate 142 is clamped between the bracket 140 and the sleeve 182, so that the bracket 140 is bound in place and cannot turn. The nut 184 is provided with a handle 186 which is accessible through a slot 188 formed in adjacent frame member 11. When it is desired to adjust the cutting unit, the nut is backed off a fraction of a turn and, after the desired adjustment has been effected, the nut is re-tightened. Flange 185 of the sleeve 182 supports the gear 158 and is, in turn, supported by a flange 187 of the nut 184. The flange 185 of the sleeve 180 is so spaced from the stationary plate 142 by the sleeve body that the gear 158 cannot be bound against the plate 142 by the tightening of the nut.

As a further safeguard against accidental turning of the bracket 140, a supplemental locking means is provided. The base of the bracket 140 is formed with a slot 190 which is concentric with the pin 16. The upper portion of the slot 190 is broader than the lower portion of the slot. The headed clamping screw 192 has its head received in the broad portion of the slot 190, an upper shank portion 194 received in the lower portion of the slot, and a reduced threaded end portion 196 passed freely downward through the stationary plate 142 and screwed into a long nut 198. The shank portion 194 of the screw 192, has portions ground to form arcuate faces which conform to the curvature of the walls of the wide portion of the slot 190, so that the screw is held against rotation by the slot walls. The nut 198 is provided with an operating handle 200 which is accessible through the slot 188 of the adjacent frame member. When the nut is tightened, the screw head and the nut clamp the base of the bracket 140 and the stationary plate 142 together in an area remote from the center of rotation of the bracket 140. The parts may be unclamped by a fraction of a turn of the nut and may be reclamped by a reverse operation.

The gears 162 and 164 are supported similarly to one another from the face of the bracket 140. The support of the gear 162 will be described as sufficing for both. A bearing pin 202 is formed with a flange 204 near its upper end. The upper end of the pin is fitted in a bore 206 of the bracket 140 and the flange 204 is disposed to bear upward against the bracket. Screws 208 (one shown) are passed upward through the flange and threaded into the bracket for securing the pin in place. The gear 162 is rotatively mounted on the lower end of the pin and is retained in place by a collar 210 fixed on the pin 202 at the lower side of the gear.

The shaft 168 (Fig. 18) is rotatively supported in horizontal arms of a C-shape bracket 212, which bracket is affixed to one of the upright members 144 of the bracket 140. The gear 166 is mounted on the lower end of the shaft 168, being key connected thereto, and being held in place by a washer 214 and a headed screw 216, the screw being threaded axially into the lower end of the shaft.

The rotary blade 154 may be disturbed in phase by the rotative adjustment of the bracket 140. The gear 153 is connected to its drive shaft 100 through a screw 218 (Fig. 7). Should it be desired to correct a disturbance of phase adjustment of bracket 140, or to adjust the timing of the cutting unit relative to other operating instrumentalities, the set screw 218 may be loosened to permit the adjustment and then retightened when the adjustment has been made.

As has been stated, the feed mechanism 24 comprises an upper segment 26. The segment is opposed by a solid lower idler roller 25 of smaller diameter than itself (Fig. 5). The roller 25 is spring urged upward but limited in its upward movement by stop mechanism. These details connected with a roller 25 will be described at a subsequent point in common with other similar rollers which are similarly mounted and similarly limited.

The segment 26 is really a composite segment. It is carried on a shaft 222. The shaft 222 is driven from the main shaft 76. A gear 224 (Figs. 9 and 51) on the main shaft drives a gear 225 fast on a shaft 227. The shaft 227 has a gear 226 adjustably fixed upon it by a set screw 229. The gear 226, through gears 228, 230, 232, 234, a shaft 236 and bevel gears 238 (Fig. 12) and 240, drives the shaft 222, the last two gears being fast, respectively, upon shafts 236 and 222. The shaft 236 has the segment 34 upon it. The segment 34 is an element of the feeding unit 32 which at times requires phase adjustments relative to the parts which precede it. Phase adjustment of the unit 32 could objectionably disturb the phase adjustment of the shaft 222. In order that the shaft 222 may be adjustable relative to the shaft 236, the bevel gear 238 is made fast on the shaft 236 by means of a set screw 242.

The construction and principle of operation of the segment 26 are illustrated in Figures 19 to 26, inclusive. Two fixed short segments 244 are key connected to the shaft 222 and are secured to the shaft by set screws 246. The segments 244 correspond in phase and in angular extent with one another, so that they act as one. The leading edges of the segments 244 always engage the blanks simultaneously at the instant when the cutting is completed. They are overlapped, or partially overlapped by a further segment 248 which is mounted on the shaft 222 between the segments 244 with capacity for rotative adjustment relative to the shaft.

The segment 248 comprises complementary members 250 and 252 which are secured to one another by headed screws 254. The segment 248 is mounted upon a collar 256 which surrounds the shaft 222 between the segments 244 and which is adjustable circumferentially of the shaft. The collar 256 is cut away at one side to provide a slot 257 of substantial angular extent. A headed screw 258 has its shank passed through the slot 257 and threaded into the shaft 222. The screw shank mechanically limits adjustment of the collar circumferentially of the shaft, preventing the leading edge of the segment 248 from being located in advance of the leading edges of segments 244, and preventing the leading edge of segments 248 from being located in back of the trailing edges of the segments 244. A plate 259 under the head of the screw 258 overlies marginal portions of the collar 256 which border the slot 257. The screw may be tightened to clamp the collar 256 through the medium of the plate 259 in adjusted position when desired.

A segmental block 260 is set in a slot 261 of the upper member 250 and bears against the collar 256, being firmly clamped to the collar by a headed screw 262. The block 260 has parallel adjusting screws 264 screwed through its opposite ends into engagement with the hub member 250. Normally, the screws 264 bear firmly against the hub member 250 so that adjustment of the collar 256 and the block 260 causes corresponding adjustment of the segment 248. When the collar 256 has been adjusted and secured in place by the screw 258, a further micrometric adjustment of the segment 248 relative to the block 260 may be effected by backing off one of the screws 264 a short distance and advancing the other. The segment 248 is free to respond to the micrometric adjustment because the hub members are not bound on the collar 256 by the screws 254 but are free to turn relative to the collar.

As shown, the segments 248 have substantially the same angular extent as the segments 244. This does not afford a sufficient range of adjustment to meet all cases. Accordingly, substitute members 252 are provided which carry segments substantially two and three times as long as the segment 248 shown in Figures 20 and 21.

The turning cones of the mechanism 22 are driven from the main shaft 76 at two revolutions per cycle. The main shaft 76, through bevel gears 270 and 272 (Figs. 9, 12, 27 and 51), drive an inclined shaft 274 at twice the rotary speed of the main shaft. The shaft 274 is rotatively supported in brackets 276 which are affixed to side frame member 278. Side frame members 278 and 279 extend parallel to the blank feed line CD. The shaft 274 acts through a bevel gear 280 to drive a bevel gear 282 fast on a transverse shaft 284. The bevel gear 282 drives a bevel gear 286 fast on a shaft 288, which shaft is rotatively mounted in ears 290 affixed to the side frame member 278. The shaft 288, through gears 292 and 294, drives the shaft 296 of lower cone 298. The shaft 296, through bevel gears 300 and 302 drives the shaft 304 of upper cone 306.

The lower cone 298 is rotatively mounted in fixed bearings 308 and 310, which bearings are fixedly supported on the stationary plate 142. The upper cone shaft 304 is supported from an overhead frame bar 312 in bearings 314 and 316. The bearings 314 and 316, though of different sizes, are of similar construction and are similarly mounted. A description of bearing 314 and its mounting will suffice for both.

The bearing 314, see Fig. 12 above, is slidingly supported in a slotted bracket 318, affixed to the bar 312 and is formed with flanges which embrace the arms of the bracket at opposite sides of the slot. The bearing 314 includes a stem portion 320 which is surrounded by a compression coil spring 322. The spring bears downward against the body of the bearing 314 and upward against an abutment portion of the bracket 318. The stem extends upward through the abutment portion and receives on its upper end a slidable flanged collar 324, an adjusting nut 326 and a lock nut 328.

The bracket 318 includes, above the spring abutment portion, a fixed ear 330 in which a rod 322 is rotatively mounted. The rod has a bent end to serve as a handle, and at its opposite end (which is circular in cross section) it is ground away for substantially half its thickness at the upper side to provide a flat face for engagement with the lower face of the flange of the collar 324. The spring 322 urges the bearing 314 downward, but downward movement is normally limited by engagement of the flat face of the rod 332 with the flange of the collar 324. The collar bears upward against the nut 326 and is limited in its upward movement relative to the stem 320 by the nut 326. The nut is adjusted and locked in position normally to maintain the upper cone at a suitable level for cooperation with the lower cone. When desired, the upper cone may be raised and detained in raised position by turning the rod 332 through a quarter turn or more.

Details of the cones are shown in Figures 29 to 34. The lower cone 298 is an integral structure designed to remain permanently on its shaft 296. The cone has a bore 334 (Fig. 32) which fits the shaft, with enlargements at opposite ends of the bore. A collar 336, affixed to the shaft 296 by a set screw 338, is designed to be received in the enlargement of the bore at the larger end of the cone and to serve as a fixed abutment for establishing the position of the cone longitudinally of the shaft. The cone segment 298 is of operating height through a large angle (250° as shown) (Fig. 29) but is of reduced height throughout the remaining 110° of the circumference. In the arc of reduced height two set screws 340 are provided for adjustably securing the cone in fixed relation to the shaft. The duplication is provided as a safeguard against accidental loss of adjustment. The set screws are used normally for securing the cone in a desired fixed angular relation to its shaft, and also for holding the cone pressed against the collar 336. The mechanical location of the cone lengthwise of its shaft by the collar 336 assures that the location of the cone apex will not be changed. It also contributes importantly to the maintaining of the cone apices in coincidence with one another.

The blanks are guided to and from the cones on a table 342 (Fig. 27) which serves both as a support for the blanks and as a means for stripping the blanks free of the lower cones 298. In order that the stripping action may be realized it is necessary that the table extend continuously from one side of the cones to the other. The cone 298 is accordingly formed with grooves, and the table 342 is slotted. The grooving of the cone provides a ridged or ribbed construction of the cone, as shown. The table slots accommodate the cone ribs or ridges while the cone grooves accommodate the table portions 344 which extend continuously past the cones. It is not necessary that the cone 298 be ribbed throughout its length. At its larger end the grooves are omitted and an opening is provided in the table to enable the large ends of the cones to bear continuously against one another through the table.

The upper cone 306 illustrated in Figures 28, 29, 30 and 31 includes an active segment portion which has an angular extent of 250°. As has been pointed out, this wide angle segment is not capable of meeting all needs, and provision is made for substitution. In point of fact, the cone is not replaced in its entirety but it is made in complementary parts 346 and 348, the part 348 being replaceable, but the part 346 being used all the time. The segment member 348, at its lower side, is formed with a rectangular recess 350. The complementary section 346 fills the recess and is secured to the section 348 by shouldered screws 352 whose shanks pass through bores of the member 346 and are threaded into the member 348.

The substituted cone section **348*a* (see Figs. 30 and 33), is a duplicate of the section 348, save that its active portion extends through only 180°. When a substitution is to be made the screws 352 are backed out, the cone section 348 is removed and replaced by the section 348*a* and the screws 352 are again inserted and turned home. The screws 352 clamp the segment sections immovably to the shaft 304. A collar 354 is secured in fixed position on the shaft 304 by means of a set screw 356 and served mechanically to locate the cone 306 in its proper position longitudinally of the shaft 304. Before the screws 352 have been driven in far enough to cause the cone section to clamp the shaft, the cone is pressed against the collar 354 and held there while the tightening of the screws is completed. Angular adjustment of the cone 306 relative to its shaft is taken care of by partially backing out the screws 352 and retightening them after the adjustment has been effected. The collar 354** is not disturbed and served mechanically to determine the axial position of the cone.

The cone 306, like the cone 298, is circumferentially grooved. The grooves are provided to accommodate hold-down bars, one of which, 358, is shown (Figs. 4 and 27). Additional hold-down bars may be provided when that is found desirable or necessary.

As has been pointed out, the mechanism 28 (Fig. 1) is designed to seize each blank at the precise instant when turning is completed, and to advance it rapidly to carry it clear of the cone bight and clear of the web which is following it. The mechanism 28 is driven from the main shaft 76 through gear 282 (Fig. 12) and the driving train therefor which has been previously described. The gear 282, as has been noted, is fast on a shaft 284. The shaft 284 is supported in side frame member 278 (Fig. 35) and in a bracket 360. The shaft 284, through equal spur gears 362 and 364, drives a shaft 366. The gear 364, through a gear 368, drives a shaft 370 upon which the segment 30 is mounted.

The gear 368 is connected to the shaft 370 through a set screw 372, so that the shaft 370 can be adjusted in phase relation to the other operating parts when desired. The shaft 370 is rotatively supported in frame member 278 and in an overhead bracket 372' which depends from the rigid cross bar 312.

The segment 30 comprises complementary members 376 and 378 (Fig. 43), the member 376 including a segment which is active through a substantial angle, 160° as shown. The member 378 is a mere complementary hub member which is clamped to the shaft 370 by headed screws 380. The shanks of the screws 380 are passed through bores in the member 378 and are threaded into the member 376. The screws 380 may be loosened when it is desired to adjust the segment 30. More commonly, however, the adjustment would be effected by retracting and then re-tightening the set screw 372 (Fig. 35) so that the shaft 370 can be adjusted in phase and relocated without disturbing the connection of the segment 30 with said shaft.

The segment 30 makes two revolutions per cycle. Since it is, as shown in Fig. 43, active for 160°, it will be effective to advance the work for 2⁄9 of a cycle in a first revolution, and will again run in active position but without any blank to act upon in a corresponding period of the second revolution of a cycle. There is also provided a subsitute segment section **376*a* which has an active extent of 252° of seven-twentieths of a cycle. The segment, section 376*a* is formed to fit and partially surround the segment section 378. It is secured to the segment section 378 by the same screws 380 and in the same manner that the segment section 376 is secured to the section 378**.

The shorter segment section 376 is used for blanks which are relatively wide, fore and aft, and which therefore require to be turned through comparatively large angles, whereas the longer segment section **376*a*** is used for blanks which are relatively narrow fore and aft and which therefore require to be turned through comparatively small angles.

The segment 30 is opposed from below the path of blank feed by a complete roller 382 (Figs. 35, 36 and 37) which is supported on a shaft 384, carried by arms 386 of angle levers 388. The angle levers 388 are pivotally supported on pivot pins 390 which are carried by upstanding arms 392 of a bracket 394 (see Figs. 39, 40 and 41 also). The bracket 394 includes a horizontal base portion 396 which is carried on the horizontal plate 142. Downwardly extending arms 400 of the levers 388 are drawn toward the left (as viewed in Fig. 36) by tension coil springs 402 to urge the roller 382 upward.

Upward movement of the roller 382 is normally limited to a proper position for cooperation with the segment 30 by means of rotatable cams 403, fast on shafts 404 which engage the arms 400. Each shaft 404 also has fast upon it a worm gear 406 by which it may be adjusted rotatively to locate the cams in precise positions of angular adjustment. Vertically disposed rods 408 are rotatively supported in extensions 410 of the bracket arms 392, and have fast upon them worms 412 which mesh with the respective worm gears 406. Each rod 408 is provided at its upper end with a screw driver slot 414 through which it may be turned to adjust the associated cam. When the desired adjustments have been secured, the shafts 404 are locked against further rotation by set screws 416.

A horizontal cast-off rod 418 of generally circular cross section is rotatively mounted in the upstanding arms 392 of the bracket 394. The rod has notches 420 (Fig. 38) formed in it opposite the arms 400 of the levers 388. The rod is provided with a handle 422. By operating the handle through a right angle or more the roller 382 can be moved away from, and held clear of, the segment 30. Upon restoration of the handle 422 to normal position the arms 400 are returned by the springs 402 into engagement with the cams 403.

Notwithstanding the capacity of the roller 382 (Figs. 36, 37 and 38) and its shaft 384 for adjustment toward and from the segment 30, provision is made for driving the shaft and roller. The shaft 366 is connected through universal joints **366*a* and 366*b*, and an interposed shaft section 366*c* to drive the shaft 384**.

As has been mentioned, the feeding mechanism 32 for forwarding blanks delivered by the mechanism 28 comprises segments 34, 36, 38 and 40 and rollers 42 and 44. The drive from gear 226 to the shaft 236 of segment 34 has been described as including gears 228, 230, 232 and 234.

The gear 232 (Fig. 9) also drives a gear 424 which is fast on a shaft 426. The segment 36 is fast on the shaft 426. The gear 226 drives not only the gear 228 but also a gear 428 (see Fig. 51 also), which is mounted on a shaft 430. The gear 428, in turn, drives gears 432 and 434 which are fast, respectively, on shafts 436 and 438. The segment 40 is fast on the shaft 436, and the roller 42 is fast on the shaft 438. The gear 434 acts through a gear 440 to drive a gear 442 fast on the shaft 444 of roller 44. The segments 34, 36 and 40, and the rollers 42 and 44 are all of the same diameter and are all driven at constant speed and at the rate of one revolution per cycle.

The segment 38 is of the same diameter as the other segments and rollers of the group and is also driven at the rate of one revolution per cycle, but is caused to vary in speed within a cycle. The gear 228 (Fig. 9) drives a gear 446 (Figs. 48 and 53) which is fast upon a sleeve 448, being secured thereto by a key 450 and a set screw 452. The sleeve 448 is rotatively mounted on a shaft 454, which shaft has affixed to it the segment 38. The sleeve 448 and a reduced end portion of the shaft 454 extend into a casing 456.

The casing 456 comprises a cup shaped member 458 which is rigidly supported by arms 460 to the machine frame member 278. The casing also includes a bearing ring 462 which is secured to the member 458 by screws 464. The ring includes inwardly extending arms 466 which support a central circular bearing portion 468. The bearing portion 468 surrounds and rotatively supports the outer end of the sleeve 448, and through the sleeve supports the outer end of the shaft 454. The casing further includes a transparent end closure member 470 which is affixed to the bearing ring by screws 472. Lubricant filling and drain openings of the casing member 458 are normally closed by threaded plugs 474 and 476.

The sleeve 448 is deeply notched intermediate its ends to accommodate a spur gear segment 478 which is split and clamped on the shaft 454 by a screw 455. The gear segment 478 is in constant mesh with another gear segment 480 which is rockably supported on a pivot pin 482. The pivot pin 482 is fixedly supported in ears 484 of the sleeve 448. A hub portion of the gear segment 480 has integral with it an arm 485, which, through a pivot screw 486, rotatably supports a cam follower roller 488. The roller 488 is received within a cam groove 490 of a stationary cam 492. The cam is affixed to the casing member 458 by headed screws 494, being supported by the casing interiorly thereof. The shanks of the screws 494 pass through arcuate slots 495 of the casing, and are threaded into the cam 492, thus enabling the cam to be adjusted angularly relative to the casing. The cam is made to fit and completely fill the left end of the casing (Fig. 53) so that loss of lubricant through the slots 495 is prevented.

It will be seen that the drive is transmitted from the gear 228 to the segment 38 through gears 446, sleeve 448, gear segment 480, gear 478 and shaft 454. The cam track has two major portions of uniform diameter, one of small radius and the other of large radius. As the sleeve 448 is driven clockwise (Fig. 52) it carries the segment 480 in a clockwise direction with it. The segment is held against rotation about the axis of the pin 482 and hence drives the gear segment 478 in unison with the sleeve 448. As the roller 488 traverses that portion of the track which carries it away from the axis of the shaft 454 it causes the segment to impart a counterclockwise component to the gear segment 478. The track is so designed that the rocking of the gear segment slows down and then arrests the gear segment 478, causing it to stand at rest for a brief but important period sufficient to enable the notching cutters 46 (Fig. 1) to act on a blank while the blank is at rest. The gear is then accelerated to normal speed as the cam track portion traversed gradually becomes circular in form. Later in the cycle, after the blank has been released by the segment 38, the roller 488 is displaced by the cam track toward the axis of the shaft 454. This causes the shaft 454 to regain its original phase relation to the sleeve 448.

The parts of the unit 32 are shown in Fig. 10 in the positions which they occupy at the instant of notching. Each of the segments, as shown, has an angular extent of 150°. The segment 34 may have its active period overlap the active period of the mechanism 28, and it is important that a considerable latitude for variation of the degree of overlap be provided at this point. The segment 36 is shown as having its active period overlap the active period of the segment 34. Each of segments 38 and 40, as shown, assumes control of the blank just as the blank is released by the preceding segment, but it is not essential to avoid overlap at these points. It is, of course, essential, that each feeding segment be capable of advancing the blank into the field of action of the element which follows it. It is also important that there shall be no hiatus in the control of the blank.

Each of the feeding members 34, 36, 38, 40, 42 and 44 is opposed from below by an idler feed roller. Identical rollers 496, similarly mounted, are provided opposite segments 34, 36 and 40, and opposite rollers 42 and 44. A description of one will therefore suffice for all. The structure is shown in detail in connection with the roller 496 opposite the roller 44.

A standard 498 extends upward from a supporting bar 500 and near its upper end supports a rocking lever 502. The roller 496 is rotatably mounted on one end of a lever 502. The tail of the lever is drawn downward by a spring 504, so that the roller 496 is constantly urged upward. A rod 506 of generally circular cross section is cut or ground half way through opposite the lever 502 to provide a notch, against the base of which the lever tail constantly tends to bear. The base of the notch may limit downward movement of the lever tail and thereby limit upward movement of the roller 496 to a position clear of the peripheral path of the opposed feeding member. The rod 506 is provided with an operating handle 508. By giving the rod a quarter turn the roller may be moved away from the opposed roller 44, and retained in cast off condition.

The segment 38 is yieldingly opposed by feed rollers 510 which are the same in principle but different in detail from the rollers 496. The rollers 510 (Figs. 10 and 14) are rotatively mounted upon a cross rod 512, being confined by collars 514, and spaced from one another by a sleeve 516. The rod 512 is supported in parallel swinging arms 518 and 520 which are disposed respectively at the operator's side of the machine and at the opposite side of the machine. The arms 518 and 520 are secured to the rod 512. The arm 518 is drawn upward by a spring 522 (Figs. 10*a* and 14), and is limited in its upward movement by engagement with a flat sided cast-off rod 524. The rod 524 is bent to provide a handle. The flat face of the rod normally limits upward movement of the rollers 510 to positions just clear of the peripheral path of the segment 38. The rollers may be cast off by giving the rod 524 a quarter turn by its handles.

The notching cutters 46 act with the blank at rest in the position illustrated at **20*c* in Figure 1. Through suitable adjustment of the blank feeding means the blank can be arrested in a position which is symmetrical with respect to the right and left pairs of cutters, and which is also symmetrical with respect to the forward and rearward pairs of cutters. If it is desired, however, to cut the notches adjacent the sealing flap deeper than the notches adjacent the bottom flap, in order to provide a greater area of overlap for the sealing flap, that can readily be brought about by a slight timing adjustment of the feeding mechanism 32 relative to the feeding mechanism 28**.

The right and left pairs of notchers 46 are adjustable simultaneously and equally toward and from the feed line CD, and the fore and aft pairs are adjustable simultaneously and equally toward and from the vertical axial plane of the shaft 454. In other words, all four notching cutters are adjusted longitudinally of the path of blank feeding at one operation, and all four notching cutters are then adjusted transversely of said path at a second operation.

The longitudinal adjustment of the notching cutters 46 is effected through a transverse shaft 526 (Figs. 9, 10, 14, 16 and 48) which extends through the machine frame member 278 into a position accessible to the operator, and which has a square end 527 adapted to be received in the socket of an operating crank. The shaft 526 is rotatively mounted in bearings 528 of a transverse bar 529, and has fast upon it two bevel gears 530. Each bevel gear 530 has driving engagement with a similar bevel gear 532 fast upon one of two sectional shafts 534 that extend longitudinally of the machine beneath horizontal guide gears 536. Each sectional shaft 534 is supported near one end in a bearing 538 which extends downward from the associated guide bar 536. Each shaft 534 includes a section 540 which has a right hand thread, and a section 542 which has a left hand thread. Each shaft section 540 is threaded through a downward extension 541 of an associated slide block 544, each slide block is mounted for sliding movement on the associated guide bar 536. Each shaft section 542 is threaded through a downward extension 543 of an associated slide block 546, each slide block being mounted for sliding movement on the associated guide bar 536.

The two slide blocks 544 are rigidly connected to one another through a transverse guide bar 548 to form a sub-carriage for adjusting the forward pair of notching cutters fore and aft in unison. The two slide blocks 546 are similarly rigidly connected to one another through a transverse guide bar 550 to form a sub-carriage for adjusting the rear pair of notching cutters fore and aft in unison.

A transverse shaft 552 (Figs. 9, 10, 14 and 48) supported in the main frame members 278 and 279 terminates at the operator's side of the machine in a squared end 553 which is adapted to be received in the socket of an operating crank. The shaft 552 has fast upon it a bevel gear 554 which, through a bevel gear 556, drives a shaft 558. The shaft 558 is mounted in bearing ears 560 on the frame member 279. Bevel gears 562 and 564 are slidably mounted on the shaft 558, being key connected to the shaft, as in Fig. 15, so that they may be rotatively driven by it while free to travel lengthwise of it. The bevel gears 562 and 564 have driving engagement respectively with bevel gears 566 and 568. The bevel gears 566 and 568 are fast respectively upon sectional shafts 570 and 572.

The shaft 570 is mounted in a bearing ear 574 of the guide bar 548 and is passed freely through blocks 576 and 578. The shaft 570 includes a right hand threaded section 580 which is screwed through a right hand threaded nut 582 affixed to the block 578, and a left hand threaded section 584 which is screwed through a left hand threaded nut 586 affixed to the block 576. The shaft 572 is mounted in a bearing ear 588 of the guide bar 550, and is passed through blocks 590 and 592. The shaft 572 includes a right hand threaded section 594 which is screwed through a right hand threaded nut 596 affixed to the block 590, and a left hand threaded section 598 which is screwed through a left hand threaded nut 600 affixed to the block 592. The bearing ears 574 and 588 have forked arms 602 affixed to them. The forked arms 602 extend into grooves 604 formed in the hubs of the gears 562 and 564 to cause the latter gears to stay in mesh with the respective gears 566 and 568.

When the shaft 552 is turned in one direction, all four of the blocks 576, 578, 590 and 592 are caused to move toward the longitudinal central feed line CD, and when the shaft 552 is turned in the opposite direction all four blocks are caused to move away from the line CD. When the shaft 526 is turned in the one direction all four of the blocks 576, 578, 590 and 592 are caused to move toward the axial plane of the shaft 454, and when the shaft 526 is turned in the opposite direction all four of the blocks are caused to move away from the axial plane of the shaft 454. The screw threads for effecting the described adjustments are of sufficiently low pitch to form irreversible drives.

Provision is made, however, for locking each of the shafts 526 and 552 (Figs. 9, 49 and 50) in set positions. The locking devices are alike, and a description of one will suffice for both. A block 606 is secured to the machine frame member 278 by a headed screw 608. The shaft 526 extends through a bore of the block and is free to turn so long as the block does not clamp it against turning. The block is formed with a slot 607 which extends downward from the bore through the lower side of the block. A headed clamping screw 610 has its shank passed freely through one jaw of the block and threaded into the other jaw. The screw is provided with an operating handle 612. The jaws of the block can be clamped on the shaft by tightening of the screw 610 to hold the shaft positively against turning.

Each of the blocks 576, 578, 590 and 592 carries a notcher 46. The structures are essentially duplicates of one another, so that a description of one will suffice for all. The block 590 and associated mechanism are shown in detail in Figs. 54 to 56, inclusive. The block 590 rotatively supports a fore and aft, horizontal shaft 614. A rotary cutter 627 is mounted on one end of the shaft and a long spiral driving gear 618 is mounted on the other end at the opposite side of the block. The block has affixed to it an extension block 620 upon which angularly related stationary cutting blades 622 and 624 are secured by screws 626 and with which rotatable cutters 627 cooperate. A trash disposal chute 628 is secured to the block 590 by long headed screws 630, in position to catch the chips which are formed at the notching operation. The several chutes are desirably flexibly connected to a common source of suction (not shown). It will be noted that with the construction described the rotary cutter, the stationary cutter and the trash collecting chute are adjusted in unison for each notching unit.

The notching cutters are driven from the gear 228 (Fig. 9) which, as has already been pointed out, is driven from the main shaft 76. The gear 228 is fast upon a transverse shaft 632 (Fig. 9), which shaft has fast upon it, at the side of machine remote from the operator (Fig. 11), a gear 634. The gear 634, through gears 636 and 638, drives a shaft 640 at the rate of one revolution per cycle. The shaft 640 has fast upon it two long spiral gears 642 (Figs. 10 and 14), which gears drive the spiral gears 618 fast, respectively, on the drive shafts 614 of the rotary notching cutters 627 carried by the blocks 590 and 592. Although the spiral gears 618 are adjusted both longitudinally and transversely of the machine, and relative to the bodily fixed spiral gears 642, the driving connection through the spiral gears to the notching cutters is not broken.

The gear 634 (Fig. 11) acts through gears 644 and 646 to drive a shaft 648 at the rate of two revolutions per cycle. The shaft 648 has fast upon it long spiral gears 650 (Fig. 14), which gears drive the spiral gears 618 fast, respectively, on the drive shafts of the rotary notching cutters 627 carried by the blocks 576 and 578. These latter spiral gears serve in the manner already explained to maintain the driving connection to the rear pair of rotary cutters under various conditions of adjustment.

Provision is made for adjusting the rotary notching cutters 627 in phase relative to the other operating parts. For that reason the gear 638 (Fig. 14) is connected to the shaft 640 through a set screw 652, and the gear 646 is connected to the shaft 648 through a set screw 654.

It will be noted that the rear notching cutters 627 are made to turn twice as fast as the forward notching cutters. All the cutters, of course, are required to cut just one notch per cycle. It has been found, however, that each notching cutter intersects the path of blank travel throughout a substantial part of a revolution, and that if the rear notching cutters are caused to make just one revolution per cycle there will be intereference with the blank which is moving into position to be cut. By doubling the speed of the rear cutters the period of blank path intersection just prior to the cutting operation is cut in half and the interference is avoided. Avoidance of the interference is helped by two other factors; (1) the fact that the blank is slowed down after the blank has cleared the rear notching cutter path increases somewhat the period during which the cutters can travel without interference in intersecting relation to the blank path just prior to cutting; and (2) the fact that the edge of the rotary cutter is located on a radius which slopes upward at an angle of about 30° when moving into and out of intersecting relation to the horizontal blank path (see Fig. 48) cuts down the period of intersection. As a result of the combination of these features, the rotary cutter travels in intersecting relation to the blank path for approximately one-sixth of a cycle just prior to cutting, and only while the blank is traveling a distance somewhat less than the radius of the segments 38.

After notching, the blank is accelerated to normal speed by the segment 38 and is turned over to the constant speed segment 40. The segment 40, in turn, delivers the blanks to the action of the feed roller 42, whence it continues to feed roller 44. While passing the feed roller 44 the tips of one or both of the end flaps may be trimmed by corner trimming mechanisms 47, if desired.

There are two of the corner trimming mechanisms 47 (Figs. 1, 9, 13, 57 and 58). Each comprises a bracket 656, mounted on a rectangular cross bar 658. The bar is supported from the side frame members 278 and 279, being held thereto by headed screws 660 which are passed through the respective frame members and threaded into the ends of the cross bar 658. Adjacent each frame member a U-shaped bracket 659 extends around three sides of the cross bar 658, to help support the cross bar and to fix the cross bar against turning. Each bracket 659 is affixed to the associated frame member by pins 664 and a screw 666.

Each bracket 656 is formed with a hollow rectangular extension 668 which is open at one side. The extension 668 fits upon the rectangular cross bar 658 and is held thereto by a plate 670. The plate 670 is secured across the open end of the extension 668 and is secured to the upper and lower arms thereof by headed screws 672. The extensions 668 slidingly support the brackets 656 on the bar 658. Each bracket is normaly secured in fixed relation to the bar 658 by a set screw 674.

A cross shaft 676, supported in the side frame members, is driven from the gear 434 through gears 440 and 678, the gear 678 being fast on the shaft 676. The shaft 676 has slidably keyed upon it two gears 680, each associated with, and constituting the driver for, one of the trimming mechanisms 45. Each gear 680 has a hub portion 681 (see Fig. 59 also), formed with a circular peripheral groove 682. A block or plate 684, slidably mounted on a guideway 685 of the bracket 656, has a portion engaged in the groove 682, so that the position of the gear 680 lengthwise of the shaft 676 is controlled by the block 684. A pin 686, secured to the block 684 by a headed screw 688, extends horizontally through a bore formed in an ear 690 of the bracket extension 668. A detent ball 692 engages the lower side of the rod and is adapted to be lodged in either of two detent notches 694, 696 of the rod 686. The ball 692 is urged upward by a detent spring 698, lodged in a bore 700 of the ear 690. The lower end of the bore is closed by a screw threaded abutment plug 702.

With the parts in the relative positions shown in Fig. 58, the gear 680 is maintained in mesh with a gear 704 to drive the latter. The gear 680 is always connected with the shaft 676 through a pin 705 fast on the sleeve 581 and engaging in a slot 706 in shaft 676. The driving condition of the gear 680 is maintained when the trimmers are located in cutting positions. When a bracket 656 is adjusted laterally of the machine into a position to cause the trimmer carried by it to escape engagement with the envelope blanks, the gear 680 may be manually shifted relative to the bracket 656 to a position like that shown in Figs. 60 and 61. The gear 680 is then shifted out of engagement with the gear 704 by the rod 686, causing the ineffective end flap tip trimmer to remain idle. After the gear 680 has been shifted out of engagement with the gear 704 the trimmer unit 45 may be moved out of the way close to the side frame (Fig. 61).

The gear 704 is made fast upon a short shaft 707. The shaft 707 is rotatively supported in the associated bracket 656. A flange 708 on the shaft 707 engages one side of the bracket 656 while the hub of the gear 704 is held against a shoulder on the opposite end of the shaft 707 by a headed screw 710. The screw 710 is threaded axially into the shaft 707. The gear 704 has driving engagement with a gear 712 which is fast on a horizontal shaft 714. The shaft 714 is rotatively supported in the bracket 656. A flange 716 on the shaft 714 engages one side of the bracket 656 while hub of the gear 712 is held against a shoulder on the opposite end of the shaft 714 by a headed screw 718, the construction and arrangement being like that described in connection with the shaft 707.

A rotary trimming cutter 720 is made fast on the shaft 714, by means of a set screw 722 which is threaded into the hub of the cutter. A similar cutter 724 is keyed on the shaft 707 by a key member 709, being rotatively driven through the key connection but free to slide longitudinally of the shaft. The cutter 724 overlaps the cutter 720 and is yieldingly pressed against the latter by a compression coil spring 726 which surrounds the shaft 707. A washer 727 held on the shaft 707 by headed screw 728, threaded into an end of the shaft 707 takes the counterthrust of the spring 726.

The brackets 656 (Fig. 57) are made hollow to form passageways for the disposal of cut off tips of blanks as indicated at 656*a* in Fig. 57. The lower ends of the passageways 656*a* are flexibly connected to a suitable source of suction (not shown). The bracket 656 has a slot 656*b* formed in it opposite the trimming cutters through which the blank tips enter the bracket.

Reference has been made to the blank supporting table 342 (Fig. 27) and to a hold-down bar 358 associated therewith, in connection with the cones 298 and 306. Facilities of this kind are common in the art. They are employed throughout the machine whenever their employment is found desirable and feasible. Specifically, a table section 728 (Fig. 4) supports the web between the roller 12 and the flying cutter 14. Hold down bars 730, supported from above by rods 732, overlie the table 728. A second table section 734, carried by the bracket 140 and adjustable in unison with it, immediately underlies the table section 728. A similar table section 736, also carried by the bracket 140 and adjustable in unison with it, immediately overlies the table section 342. The table sections 728 and 342 have their ends which lie nearest the cutting mechanism 14 angularly formed so that they will not interfere with angular adjustment of the mechanism 14. The table sections 728 and 734 have their edges which face toward the stationary cutting blade 18 disposed in parallelism with the blade 18.

Hold down bars 738 and 740, supported from above by rods 742 and 744, overlie the table 342 in positions to guide the end flaps of the blanks.

The table 342 terminates adjacent the notching station. Beyond the notching station table sections 746, 748 and 750 are provided. A long central hold down bar 752, supported from above by rod 754, overlies the table sections 342 and 748, and extends into a groove 756 of the segment 30. Additional hold-down bars 758 and 760, supported from above by rods 762 and 764, overlie the table sections 746 and 750, respectively.

In Figs. 62 and 63 a modified form of upper cone segment 774 is illustrated which is adapted through adjustment to vary the angular extent of its active portion. This segment may also be adjusted in its entirety relative to the shaft 304. The novel upper cone is shown cooperating with a circularly complete lower cone 776 which is made fast on the shaft 296 by a set screw 778. The lower cone is formed with clearance grooves 770 for cooperation with a slotted table 342 (Fig. 27) as previously described. Similar grooves are provided in the sections of the upper cone to accommodate one or more hold-down bars 358.

The upper cone 774 comprises a body part 775 which includes a solid raised or active segment portion 777, of small angular extent, and circumferential ribs 778 which are separated by grooves 780. The ribs, together with the solid part 777, provide an active surface having a circumferential extent of substantially 180°. The body part 775 is adjustably fixed relative to the shaft 304 by a set screw 782. A complementary segment section 784 comprises hub members 786, radial arms 788 and a connecting segment portion 790. Fingers 792 extend circumferentially from the segment portion 790 to form with 790 a segment section whose angular extent is a little less than 180°. The fingers 792 complement the ribs 778, and the segment portions 776 and 790, to provide the complete active surface of the cone segment. The segment section 784 is adjustably secured in place on the shaft 304 by set screws 796. By relative adjustment of the segment sections 774 and 784 the effective angular extent of the segment 772 may be adjusted between limits of a little less than 360° and somewhat more than 180°. When a lesser active angle is desired, sections like 774 and 784 may be substituted of less angular extent than the parts shown.

Alternatively, the cone segment 774 may be used opposite a lower cone segment 298 shown in Fig. 27, in which case the more extensive range of the Fig. 27 mechanism could be fully realized without resort to substitution of parts. Still further, two of the cone segments 772 may be used opposite one another to provide a still more extensive range of adaptability without substitution of parts.

While the illustrative machine is susceptible of very extensive variation without departure from the principle of the invention, it may be pointed out that the machine is illustrated herein and as commercially manufactured is capable of accommodating commercial envelopes ranging from 3⅛" by 5½" to 4⅛" by 9½", and baronial envelopes ranging from 4½" by 4½" to 5½" by 8¼". The full wide range of envelopes can still be made on the machine to which the present mechanism is applied as an attachment when the present mechanism is disabled and the usual stack feeder for die cut envelopes is used in its place.

I have described what I believe to be the best embodiments of my invention. I do not wish, however, to be confined to the embodiments shown, but what I desire to cover by Letters Patent is set forth in the appended claims.

I claim:

1. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a turner comprising opposed, cone segments, drive shafts for the cone segments, means for securing the cones in different selected phase relations to their drive shafts to cause the cones to seize each blank as it reaches an initial turning position and to turn the blank through a selected angle appropriate to the shape of the blank for locating its fore and aft diagonal in a prescribed blank feed line, and a segmental feeder adjustable in its timing and length of feed to seize each blank just as the cutting of the blank is completed and to release it in initial turning position just as it is seized by the cone segment.

2. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, and a segmental feeder adjustable in its timing and length of feed to seize each blank just as the cutting of the blank is completed and to release the blank in initial turning position just as it is seized by the cone turner.

3. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone.

4. A machine as set forth in claim 3 in which the cones are driven at two revolutions per cycle and are of sufficient size to avoid interference between the turning or turned blank and the following web or blank.

5. A machine as set forth in claim 3 in which operating means are provided for driving the first segmental feeder at the rate of one revolution per cycle, the cone turner at the rate of two revolutions per cycle, and the further segmental feeder at the rate of two revolutions per cycle, the last mentioned segmental feeder being of one-half the diameter of the first segmental feeder.

6. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone, further feeding mechanism acting to take over each blank from said further segmental feeder and including means for bringing each blank briefly to rest in a prescribed notching position, and notching mechanism acting in time with said further feeding mechanism to notch the four edges of the blank simultaneously precisely during the interval when the blank stands at rest.

7. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone, further feeding mechanism acting to take over each blank from said further segmental feeder and including means for bringing each blank briefly to rest in a prescribed notching position, rotary notchers acting in time with said further feeding mechanism to notch the four edges of the blank simultaneously precisely as the blank stands at rest, there being two forward rotary notchers and two rear notchers, means operating the forward notchers at the rate of one revolution per cycle, and means operating the rear notchers at the rate of two revolutions per cycle, said notcher operating means being timed in relation to the further feeding mechanism and to one another to notch the four edges of the blank simultaneously precisely during the interval when the blank stands at rest.

8. A cyclically operating machine for producing, from a web, notched rhombic blanks of a wide variety of sizes and shapes and delivering them ready for manufacture into envelopes, in combination, means for feeding webs of various widths along a prescribed feed path at different rates of feed to produce different selected lengths of feed in a cycle, blank cutting means settable at various angles relative to the direction of web feeding and operable to cut a blank from the leading end of the web in each cycle, means for continuing the advance of the cut blanks along the web feed path, means for turning the blanks to locate their fore and aft diagonals in coincidence with a prescribed center line of blank feeding which is angularly related to the web feed path, feed mechanism for advancing the blanks along said blank feed path including means for arresting the blanks briefly and notching cutters for notching the four edges of each blank while it is at rest.

9. A cyclically operating machine for producing, from a web, notched rhombic blanks of a wide variety of sizes and shapes and delivering them ready for manufacture into envelopes, in combination, means for feeding webs of various widths along a prescribed feed path at different rates of feed to produce different selected lengths of feed in a cycle, blank cutting means settable at various angles relative to the direction of web feeding and operable to cut a blank from the leading end of the web in each cycle, means for continuing the advance of the cut blanks along the web feed path, means for turning the blanks to locate their fore and aft diagonals in coincidence with a prescribed center line of blank feeding which is angularly related to the web feed path, feed mechanism for advancing the blanks along said blank feed path including means for arresting the blanks briefly, notching cutters for notching the four edges of each blank while it is at rest, the feed mechanism, after notching, causing the advance of the blank to be resumed, and trimmers for removing the end flat tips during such continued advance.

10. A cyclically operating machine for producing, from a web, notched rhombic blanks of a wide variety of sizes and shapes and delivering them ready for manufacture into envelopes, in combination, means for feeding webs of various widths along a prescribed feed path at different rates of feed to produce different selected lengths of feed in a cycle, blank cutting means settable at varoius angles relative to the direction of web feeding and operable to cut a blank from the leading end of the web in each cycle, means for continuing the advance of the cut blanks along the web feed path, means for turning the blanks to locate their fore and aft diagonals in coincidence with a prescribed center line of blank feeding which is angularly related to the web feed path, feed mechanism for advancing the blanks along said blank feed path including means for arresting the blanks briefly, notching cutters for notching the four edges of each blank while it is at rest, the feed mechanism, after notching, causing the advance of the blank to be resumed, trimmers for removing the end flap tips during such continued advance, and means for rearranging the blanks into fanned out relation preparatory to seal flap gumming.

11. A cyclically operating machine for producing, from a web, notched rhombic envelope blanks of a wide variety of sizes and shapes comprising, in combination, means for feeding different selected lengths of web along a prescribed web feed path in a cycle, means for cutting the web once in each cycle at any one of a wide variety of angles to vary the shapes of the rhombic blanks produced, means for turning each blank through an angle appropriate to its shape to align its fore and aft diagonal with a prescribed line of blank feeding, means for notching the edges of each blank at a notching station, and means for conveying the blanks along said prescribed feed path to and beyond the notching station.

12. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone, further feeding mechanism acting to take over each blank from said further segmental feeder and including means for bringing each blank briefly to rest in a prescribed notching position, and notching mechanism acting in time with said further feeding mechanism to notch the four edges of the blank simultaneously precisely during the interval when the blank stands at rest, means for symmetrically adjusting the notching cutters with relation to the prescribed center line of blank feeding at one operation, means for symmetrically adjusting the notching cutters with relation to a prescribed transverse line at another single operation, and means automatically maintaining driving connection to the notching cutters in all available positions of adjustment.

13. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed ot seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone, further feeding mechanism acting to take over each blank from said further segmental feeder and including means for bringing each blank briefly to rest in a prescribed notching position and notching mechanism acting in time with said further feeding mechanism to notch the four edges of the blank simultaneously precisely during the interval when the blank stands at rest, means for symmetrically adjusting the notching cutters with relation to the prescribed center line of blank feeding at one operation, means for symmetrically adjusting the notching cutters with relation to a prescribed transverse line at another single operation, and driving mechanism for the notching cutters comprising a pair of bodily fixed driving shafts, pairs of driven shafts disposed at right angles to the driving shafts and adjustable in either of two directions at right angles to one another, and interengaged long spiral gears on each driving shaft and each shaft driven thereby to provide a driving connection between them, which spiral gears maintain their operative engagement throughout adjustment of the driven shafts.

14. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone, a succession of further feed segments operated at uniform speed for taking over each blank and advancing it at uniform normal speed toward a notching station, a variable speed segment traveling at normal average speed for taking over the blank while traveling at normal speed, means for causing the variable speed segment to arrest the blank briefly at the notching station and then to accelerate it to normal speed, and notching mechanism acting in time with said variable speed segment to notch the four edges of the blank simultaneously, precisely during the interval when the blank stands at rest.

15. A cyclically operating machine for producing, from a web, rhombic envelope blanks of a wide variety of sizes and shapes, and delivering them ready for manufacture into envelopes comprising, in combination, means for feeding the web at different selected constant speeds to cause different selected lengths of web to be fed out in a cycle along a prescribed web feed path, a flying cutter operable to cut blanks at uniform intervals and at the rate of one revolution per cycle from the leading end of the web, means supporting the flying cutter in different positions of angular adjustment relative to the direction of web feeding to cause it to produce blanks of different desired shapes, a cone turner adjustable in its timing and angle of feed to seize each blank as it reaches an initial turning position which is varied according to the shape of the blank and to turn it through a prescribed angle appropriate to the shape of the blank, for locating the blank with its fore and aft diagonal in a prescribed line of blank feeding, a segmental feeder in advance of the cone turner, adjustable in its timing and length of feed to seize each blank just as the cutting of the blank is completed and to release the blank in initial turning position just as it is seized by the cone segments, and a further segmental feeder following the cone turner, adjustable in its timing to seize each blank just as the turning of the blank is completed by the cone, a succession of further feed segments operated at uniform speed for taking over each blank and advancing it at uniform normal speed toward a notching station, a variable speed segment traveling at normal average speed for taking over the blank while traveling at normal speed, means for causing the variable speed segment to arrest the blank briefly at the notching station and then to accelerate it to normal speed, notching mechanism acting in time with said variable speed segments to notch the four edges of the blank simultaneously precisely during the interval when the blank stands at rest, and a following constant speed segmental feeder for taking over the blank at normal speed after notching and continuing the advance of the blank at that speed.

16. A cyclically operating machine for producing, from a web, notched rhombic blanks of a wide variety of sizes and shapes and delivering them ready for manufacture into envelopes, in combination, means for feeding webs of various widths along a prescribed feed path at different rates of feed to produce different selected lengths of feed in a cycle, blank cutting means settable at various angles relative to the direction of web feeding and operable to cut a blank from the leading end of the web in each cycle, means for continuing the advance of the cut blanks along the web feed path, means for turning the blanks to locate their fore and aft diagonals in coincidence with a prescribed center line of blank feeding which is angularly related to the web feed path, feed mechanism for advancing the blanks along said blank feed path including means for arresting the blanks briefly and notching cutters for notching the four edges of each blank while it is at rest, the web feed path and the center line of blank feeding making a fixed angle with one another which exceeds a right angle by an amount of the order of fifteen degrees in order to limit the required angle of blank turning and thereby increase the versatility of the machine with respect to the handling of blanks of varied shapes.

17. In a cyclically operating machine for producing, from a web, rhombic envelope blanks of a wide variety of sizes and shapes, in combination, means for feeding webs at different selected speeds in an invariable web feed path to cause different selected lengths of web to be fed out and cut in a cycle, a flying cutter mounted for angular adjustment to vary the shapes of the blanks, a cone turner, adjustable to turn blanks of different shapes to different angular extents, and a segmental feeder for advancing the blanks from cutting position to the position of initial turning, the location of the blank center at cutting being varied according to the length of the blank and the required location of the blank center at the initial position of turning being varied according to the shape of the blank, said segmental feeder comprising a composite segment consisting of overlapping segment sections, at least one of said sections being angularly adjustable relative to the other to determine the effective angular extent of the composite segment, and to cause the release of the blank in the initial position of turning.

18. In a cyclically operating machine for producing, from a web, rhombic envelope blanks of a wide variety of sizes and shapes, in combination, means for feeding webs at different selected speeds in an invariable web feed path to cause different selected lengths of web to be fed out and cut in a cycle, a flying cutter mounted for angular adjustment to vary the shapes of the blanks, a cone turner adjustable to turn blanks of different shapes to different angular extents, and a segmental feeder for advancing the blanks from cutting position to the position of initial turning, the location of the blank center at cutting being varied according to the length of the blank and the required location of the blank center at the initial position of turning being varied according to the shape of the blank, said segmental feeder comprising a drive shaft, a first segment section secured thereto, an overlapped segment section, and means for adjusting the latter section angularly about the shaft and locking it in adjusted position.

19. In a cyclically operating machine for producing, from a web, rhombic envelope blanks of a wide variety of sizes and shapes, in combination, means for feeding webs at different selected speeds in an invariable web feed path to cause different selected lengths of web to be fed out and cut in a cycle, a flying cutter mounted for angular adjustment to vary the shapes of the blanks, a cone turner adjustable to turn blanks of different shapes to different angular extents, and a segmental feeder for advancing the blanks from cutting position to the position of initial turning, the location of the blank center at cutting being varied according to the length of the blank and the required location of the blank center at the initial position of turning being varied according to the shape of the blank, said segmental feeder comprising a drive shaft, a first segment section secured thereto, an overlapped segment section, and means for adjusting the latter section angularly about the shaft and locking it in adjusted position, the adjusting means comprising a collar rotably adjustable on the shaft, said collar being formed with an extensive circumferentially extending slot, a headed clamping screw having its shank pass through the circumferentially extending slot of the collar and threaded into the shaft, its block rigidly affixed to the collar and adjustable in unison with the collar and opposed micrometric adjusting screws threaded through opposite ends of the block and bearing in opposed relation against hub portions of the adjustable segment section.

20. In a cyclically operating machine for producing, from a web, rhombic envelope blanks of a wide variety of sizes and shapes, in combination, means for feeding webs at different selected speeds in an invariable web feed path to cause different selected lengths of web to be fed out and cut in a cycle, a flying cutter mounted for angular adjustment to vary the shapes of the blanks, a cone turner adjustable to turn blanks of different shapes to different angular extents, and a segmental feeder for advancing the blanks from cutting position to the position of initial turning, the location of the blank center at cutting being varied according to the length of the blank and the required location of the blank center at the initial position of turning being varied according to the shape of the blank, said segmental feeder comprising a drive shaft, a first segment section secured thereto, an overlapped segment section, and means for adjusting the latter section angularly about the shaft and locking it in adjusted position, the adjustable segment section comprising complementary separable hub portions on one of which the active segment part is carried and connecting screws therefor, to facilitate withdrawal of the segment bearing part and its replacement by a like hub portion which bears an active segment part of different angular extent.

21. In a cyclically operating machine for producing, from a web, rhombic envelope blanks of a wide variety of sizes and shapes, in combination, means for feeding webs along one feed path, means for severing rhombic blanks of various sizes and shapes from the webs, means for feeding the blanks in aligned relation along a prescribed blank feed path angularly related to the web feed path, and mechanism for turning the blanks from an initial orientation occupied by them in the web feed path to a new orientation in which the fore and aft diagonals coincide with a central feed line of the second feed path, said turning mechanism comprising a pair of convergent shafts, constant speed drive means for the shafts, angularly adjustable cone segments on the respective shafts, and means for securing each cone segment in various positions of angular adjustment.

22. In a cyclically operating machine for producing, from a web, rhombic blanks of a wide variety of sizes and shapes, a blank turning mechanism for turning blanks through a wide range of desired angles, said mechanism comprising a pair of convergent shafts, means driving the shafts at equal speeds, angularly adjustable cone segments on the respective shafts, and means for securing each cone segment in various positions of angular adjustment.

23. In a cyclically operating machine for producing, from a web, rhombic blanks of a wide variety of sizes and shapes, a blank turning mechanism for turning blanks through a wide range of desired angles, said mechanism comprising a pair of convergent shafts, means driving the shafts at equal speeds, angularly adjustable cone segments on the respective shafts, and means for securing each cone segment in various positions of angular adjustment and collars fixed on the respective shafts and constituting means for mechanically relocating the respective segments longitudinally of their shafts when a segment has been released, adjusted angularly and is being resecured to the shaft.

24. In a cyclically operating machine for producing, from a web, rhombic blanks of a wide variety of sizes and shapes, a blank turning mechanism for turning blanks through a wide range of desired angles, said mechanism comprising a pair of convergent shafts, means driving the shafts at equal speeds, angularly adjustable cone segments on the respective shafts, and means for securing each cone segment in various positions of angular adjustment, one of said segments consisting of complementary parts, the first part including the active segment portion and the second being a mere hub member, and means separably uniting said parts and operable to clamp them together on the shaft, the construction and arrangement being such that the first of said segment parts may be conveniently withdrawn and replaced by a similar part of different angular extent.

25. In a cyclically operating machine for producing, from a web, rhombic blanks of a wide variety of sizes and shapes, a blank turning mechanism for turning blanks through a wide range of desired angles, said mechanism comprising a pair of convergent shafts, means for driving the shafts at equal speeds, and cooperative conical members on the respective shafts, at least one of said members being in the form of a cone segment consisting of complementary overlapped segment sections, each independently adjustable about the shaft axis, and capable through their joint adjustment of varying the angular extent of the active feeding surface, and the exact times in a cycle when the segment begins to be, and ceases to be, active.

26. In a cyclically operating machine for producing, from a web, rhombic blanks of a wide variety of sizes and shapes, means for cutting blanks from a web and advancing them along one feed path, a blank turning mechanism operable to turn the blanks through varied angles according to their varied shapes to align their fore and aft diagonals with the center line of a prescribed line of blank feeding, said mechanism acting to surrender the blanks at different positions longitudinally of the line of blank feeding, and feed mechanism for seizing each blank and advancing it at the precise instant of its release by the turning mechanism, said feed mechanism including a shaft, a segment angularly adjustable thereon, and means for securing the segment in different positions of angular adjustment relative to the shaft.

27. In a cyclically operating machine for producing, from a web, rhombic blanks of a wide variety of sizes and shapes, means for cutting blanks from a web and advancing them along one feed path, a blank turning mechanism operable to turn the blanks through varied angles according to their varied shapes to align their fore and aft diagonals with the center line of a prescribed line of blank feeding, said mechanism acting to surrender the blanks at different positions longitudinally of the line of blank feeding, and feed machanism for seizing each blank and advancing it at the precise instant of its release by the turning mechanism, said feed mechanism including a shaft, a segment angularly adjustable thereon, and means for securing the segment in different positions of angular adjustment relative to the shaft, the segment consisting of two parts, the first a part which carries the active feeding portion and the other a mere hub part, and screws separably uniting the parts so that the first part can be withdrawn and replaced by a similar part having an active feeding portion of different angular extent.

28. In a machine for producing, from a web, notched rhombic blanks of various shapes and sizes, the combination with means for advancing the web along a first feed path, of means for severing blanks from the web, means for advancing the blanks along the same path, means for turning the blanks through different angles according to their shapes, which leave each blank with its fore and aft diagonal in coincidence with the central feed line of a prescribed second feed path but in different positions longitudinally of the latter path, a segmental feeder adjustable to pick up each blank precisely as the turning action is completed and advance it along the second feed path, and further segmental feeding mechanism adjustable in phase relative to the first for continuing the advance of the blank along the second feed path, said mechanism including at least a first segmental feeder and means operating it at a constant normal speed, a subsequent segmental feeder, and means causing said feeder to operate at variable speed so that it assumes control of the blank while running at normal speed, arrests the blank at a notching station, and accelerates the blank after notching and delivers it at normal speed, and notching mechanism operable to notch all four sides of the blank simultaneously while the blank is arrested at the notching station.

29. A cyclically operating machine for producing from a web, notched rhombic envelope blanks of a wide variety of sizes and shapes comprising, in combination, means for feeding different selected lengths of web along a prescribed web feed path in a cycle, means for cutting the web once in each cycle at any one of a wide variety of angles to vary the shapes of the rhombic blanks produced, means for turning each blank through an angle appropriate to its shape to align its fore and aft diagonal with a prescribed line of blank feeding, means for notching the edges of each blank at a notching station, and means for conveying the blanks along said prescribed feed path to and beyond the notching station, wherein said prescribed web feeding path is fixed relative to said prescribed line of blank feeding.

30. In a cyclically operating machine for producing, from a web, rhombic envelopes of a wide variety of sizes and shapes, a blank turning mechanism for turning blanks through a wide range of desired angles, said mechanism comprising a pair of convergent shafts, means for driving the shafts at equal speeds, angularly adjustable cone segments on one of said shafts, and means for securing each cone segment in various positions of angular adjustment.

References Cited in the file of this patent

UNITED STATES PATENTS

| | | |
|---|---|---|
| 1,020,550 | Graham | Mar. 19, 1912 |
| 1,265,987 | Banzett | May 14, 1918 |
| 1,291,089 | Novick | Jan. 14, 1919 |
| 1,303,371 | Novick | May 13, 1919 |
| 1,310,923 | Novick | July 22, 1919 |
| 1,353,087 | Swift | Sept. 14, 1920 |
| 1,437,843 | Heinrichs | Dec. 5, 1922 |
| 1,687,522 | Staude | Oct. 16, 1928 |
| 1,943,985 | Novick | Jan. 16, 1934 |
| 2,008,236 | Winkler et al. | July 16, 1935 |
| 2,141,574 | Wamser | Dec. 27, 1938 |
| 2,190,418 | Davidson et al. | Feb. 13, 1940 |
| 2,243,557 | Finster | May 27, 1941 |
| 2,313,986 | Brown | Mar. 16, 1943 |
| 2,506,750 | Suprenant | May 9, 1950 |
| 2,519,201 | Seidman | Aug. 15, 1950 |
| 2,548,459 | Wood | Apr. 10, 1951 |
| 2,573,332 | Herman | Oct. 30, 1951 |
| 2,696,255 | Heywood | Dec. 7, 1954 |
| 2,729,324 | Howdle | Jan. 3, 1956 |